United States Patent
Han et al.

(10) Patent No.: US 10,812,229 B2
(45) Date of Patent: Oct. 20, 2020

(54) DATA TRANSMISSION METHOD, DEVICE, AND SYSTEM

(71) Applicant: Huawei Technologies Co., Ltd., Shenzhen (CN)

(72) Inventors: Lifeng Han, Shenzhen (CN); Qinghai Zeng, Shenzhen (CN); Qufang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 42 days.

(21) Appl. No.: 16/185,946

(22) Filed: Nov. 9, 2018

(65) Prior Publication Data
US 2019/0081746 A1    Mar. 14, 2019

Related U.S. Application Data

(63) Continuation of application No. PCT/CN2016/081706, filed on May 11, 2016.

(51) Int. Cl.
*H04L 1/18* (2006.01)
*H04L 1/00* (2006.01)

(52) U.S. Cl.
CPC .......... *H04L 1/1896* (2013.01); *H04L 1/00* (2013.01); *H04L 1/0041* (2013.01);
(Continued)

(58) Field of Classification Search
None
See application file for complete search history.

(56) References Cited

U.S. PATENT DOCUMENTS

2006/0107169 A1*  5/2006  Vedantham ............ H04L 1/004
                                                         714/752
2007/0133691 A1*  6/2007  Kozat ................... H04L 1/0041
                                                        375/240.24
(Continued)

FOREIGN PATENT DOCUMENTS

CN     101562781 A    10/2009
CN     102684824 A     9/2012
(Continued)

OTHER PUBLICATIONS

Du, Wan, et al., "When pipelines meet fountain: Fast data dissemination in wireless sensor networks", pp. 365-378, SenSys '15, Nov. 1-4, 2015, Seoul, South Korea. (Year: 2015).*
(Continued)

*Primary Examiner* — Faruk Hamza
*Assistant Examiner* — Cassandra L Decker
(74) *Attorney, Agent, or Firm* — Slater Matsil, LLP

(57) ABSTRACT

A method includes the following. A first communications device obtains an $i^{th}$ data packet, divides the $i^{th}$ data packet into N data blocks, performs fountain-code encoding on the N data blocks to generate K fountain-code codewords, generates K protocol data units (PDUs) based on the K fountain-code codewords, and sends the K PDUs to a second communications device; and after the first communications device receives first acknowledgement information sent by the second communications device, the first communications device stops, based on the first acknowledgement information, sending a to-be-sent PDU in the K PDUs to the second communications device.

15 Claims, 8 Drawing Sheets

First communications device

Second communications device

(52) U.S. Cl.
CPC .......... *H04L 1/0057* (2013.01); *H04L 1/1816* (2013.01); *H04L 1/1893* (2013.01); *H04L 2001/0097* (2013.01)

(56) References Cited

U.S. PATENT DOCUMENTS

| | | | | |
|---|---|---|---|---|
| 2007/0217432 | A1* | 9/2007 | Molisch | H04B 7/026 370/400 |
| 2008/0160912 | A1 | 7/2008 | Kim et al. | |
| 2009/0125778 | A1* | 5/2009 | Uchida | H04L 1/0057 714/749 |
| 2009/0175214 | A1* | 7/2009 | Sfar | H04B 7/15592 370/315 |
| 2012/0210190 | A1* | 8/2012 | Luby | H04L 1/0083 714/755 |
| 2015/0155888 | A1 | 6/2015 | Moon et al. | |
| 2016/0254976 | A1* | 9/2016 | Hayashi | H04L 1/1819 370/252 |
| 2016/0337075 | A1* | 11/2016 | Mohamad | H04L 1/0045 |
| 2017/0093557 | A1* | 3/2017 | Doberstein | H03M 13/373 |
| 2017/0156048 | A1 | 6/2017 | Zeng | |
| 2017/0170925 | A1 | 6/2017 | Xu et al. | |
| 2017/0230144 | A1* | 8/2017 | Wu | H03M 13/3761 |

FOREIGN PATENT DOCUMENTS

| | | |
|---|---|---|
| CN | 103078707 A | 5/2013 |
| CN | 103973402 A | 8/2014 |
| EP | 3148251 A1 | 3/2017 |
| WO | 2014090195 A1 | 6/2014 |
| WO | 2015192307 A1 | 12/2015 |
| WO | 2015196551 A1 | 12/2015 |
| WO | 2016023157 A1 | 2/2016 |

OTHER PUBLICATIONS

MacKay, D.J.C., "Fountain codes", pp. 1032-1068, IEE Proc.-Commun., vol. 152, No. 6, Dec. 2005. (Year: 2005).*

* cited by examiner

DATA TRANSMISSION METHOD, DEVICE, AND SYSTEM

CROSS-REFERENCE TO RELATED APPLICATIONS

This application is a continuation of International Application No. PCT/CN2016/081706, filed on May 11, 2016, the disclosure of which is hereby incorporated by reference in its entirety.

TECHNICAL FIELD

The present disclosure relates to the communications field, and in particular, to a data transmission method, device, and system.

BACKGROUND

In a wireless network communications system, such as a Universal Mobile Telecommunications System (UMTS), a Code Division Multiple Access (CDMA) system, a Global System for Mobile Communications (GSM), or a Wireless Fidelity (Wi-Fi) system, or preferably, in a Long Term Evolution (LTE) system, to ensure reliability of data transmission, data retransmission is usually performed by using an automatic repeat request (ARQ) mechanism or a hybrid automatic repeat request (HARQ) mechanism. For example, data transmission is performed at both a Radio Link Control (RLC) layer and a Packet Data Convergence Protocol (PDCP) layer of a communications protocol by using the two retransmission mechanisms. A basic principle of the retransmission mechanisms is: In a data transmission process, using data transmission between a first communications device and a second communications device as an example, when the second communications device correctly receives a data packet, the second communications device sends acknowledgement (ACK) information to the first communications device; or when the second communications device cannot correctly receive a data packet, the second communications device sends negative acknowledgement (NACK) information to the first communications device, to indicate that the data packet needs to be sent again.

Specifically, using an example in which one data packet needs to be sent, the first communications device encodes the data packet, and then divides an encoded data packet into a plurality of protocol data units (PDU) to perform transmission, where the PDU is a data transmission unit. The second communications device performs feedback for each received PDU to ensure that the second communications device receives all PDUs, and then obtains the data packet through decoding.

In the process of implementing the foregoing solution, when data is transmitted in a wireless communications network by using the ARQ and HARQ mechanisms, the second communications device performs feedback for each received PDU, and the ACK information or the NACK information occupies excessive network resources. Especially when there is a relatively large quantity of users, such retransmission mechanisms severely affect data transmission efficiency of a system.

SUMMARY

The present disclosure provides a data transmission method, device, and system, so as to resolve a problem that, when data transmission is performed in a wireless communications network, ACK information or NACK information occupies excessive network resources, thereby affecting data transmission efficiency of a system. The technical solutions are as follows.

According to a first aspect, the present disclosure provides a data transmission method. The method includes obtaining, by a first communications device, an $i^{th}$ data packet in S data packets, where S is a positive integer, and a value of i is any positive integer ranging from 1 to S. The method also includes dividing, by the first communications device, the $i^{th}$ data packet into $N_i$ data blocks, and performing fountain-code encoding on the $N_i$ data blocks to generate $K_i$ fountain-code codewords, where $N_i$ is an integer greater than 1, and $K_i$ is an integer greater than 1. The method also includes generating, by the first communications device, $K_i$ protocol data units (PDUs) based on the $K_i$ fountain-code codewords, and sending the $K_i$ PDUs to a second communications device. The method also includes, when the first communications device receives first acknowledgement information sent by the second communications device, stopping, by the first communications device based on the first acknowledgement information, sending a to-be-sent PDU in the $K_i$ PDUs to the second communications device, where the first acknowledgement information is used to indicate that the second communications device has correctly received the $i^{th}$ data packet.

For example, an $m^{th}$ fountain-code codeword in the $K_i$ fountain-code codewords is corresponding to an $m^{th}$ PDU in the $K_i$ PDUs, where m is an integer in an interval $[1, K_i]$. The first acknowledgement information is sent by the second communications device after the second communications device receives $T_i$ PDUs, where $T_i$ is an integer in $[1, K_i]$, and $T_i$ is a quantity of PDUs, in the $K_i$ PDUs, that are received by the second communications device.

It should be noted that sending the $K_i$ PDUs to the second communications device by the first communications device indicates merely that the first communications device starts to perform an action of sending the $K_i$ PDUs to the second communications device, but does not indicate a complete process from a time at which the first communications device starts to send the $K_i$ PDUs to the second communications device to a time at which sending of the $K_i$ PDUs is completed.

For example, the first communications device is a base station eNB, and the second communications device is user equipment UE; or the first communications device is UE, and the second communications device is an eNB. The $i^{th}$ data packet is a Radio Link Control (RLC) layer data packet, or the $i^{th}$ data packet is a Packet Data Convergence Protocol (PDCP) layer data packet.

In a possible implementation, in a process of generating the $K_i$ fountain-code codewords, generating the $K_i$ PDUs, and sending the $K_i$ PDUs by the first communications device, the operations may be performed asynchronously or synchronously. When the operations are performed asynchronously, the $K_i$ fountain-code codewords may be sequentially generated, then the $K_i$ PDUs are sequentially generated based on the generated $K_i$ fountain-code codewords, and then the generated $K_i$ PDUs are sequentially sent to the second communications device. When the operations are performed synchronously, the $K_i$ fountain-code codewords may be sequentially generated; the $K_i$ PDUs are sequentially generated; after a first fountain-code codeword is generated, a first PDU is generated based on the first fountain-code codeword, and a second fountain-code codeword is generated at the same time; and when the first PDU is sent, a second PDU is generated based on the second fountain-code codeword at the same time, in other words, the three operations of generating a fountain-code codeword, generating a PDU, and sending the PDU are performed simultaneously.

Optionally, using a data packet as an example, the $i^{th}$ data packet may be a large data packet constituted by a plurality of data packets in a concatenation manner.

In a possible implementation, a total length of the S data packets is less than or equal to a length of a preset window, the preset window is used to indicate that data packets sent by the first communications device are a first data packet to an $S^{th}$ data packet in the S data packets, and after the dividing, by the first communications device, the $i^{th}$ data packet into $N_i$ data blocks, the method further includes: dividing, by the first communications device, an $(i+1)^{th}$ data packet in the S data packets into $N_{i+1}$ data blocks, and performing fountain-code encoding on the $N_{i+1}$ data blocks to generate $K_{i+1}$ fountain-code codewords, where $N_{i+1}$ is an integer greater than 1, and $K_{i+1}$ is an integer greater than 1; and generating, by the first communications device, $K_{i+1}$ PDUs based on the $K_{i+1}$ fountain-code codewords, and sending the $K_{i+1}$ PDUs to the second communications device.

In a possible implementation, after the first communications device receives the first acknowledgement information sent by the second communications device, the method further includes: when the value of i is 1, adjusting, by the first communications device, the data packets indicated by the preset window to the second data packet to the $(S+1)^{th}$ data packet.

In a possible implementation, the method further includes: discarding, by the first communications device, the $i^{th}$ data packet when duration occupied by PDUs, in the $K_i$ PDUs, that have been sent by the first communications device to the second communications device exceeds first preset duration, or when a quantity of PDUs, in the $K_i$ PDUs, that have been sent by the first communications device to the second communications device exceeds a preset quantity; and when the value of i is 1, adjusting, by the first communications device, the data packets indicated by the preset window to the second data packet to the $(S+1)^{th}$ data packet.

In a possible implementation, the method further includes: receiving, by the first communications device, second status information sent by the second communications device, where the second status information is used to indicate a quantity of PDUs, of the $(i+1)^{th}$ data packet in the S data packets, that are correctly received by the second communications device; and adjusting, by the first communications device based on the second status information, at least one of a sending quantity and a sending rate for sending a PDU of the $(i+1)^{th}$ data packet.

In a possible implementation, the receiving, by the first communications device, second status information sent by the second communications device includes: when duration occupied by PDUs that have been received by the second communications device exceeds second preset duration, receiving, by the first communications device, the second status information sent by the second communications device.

In a possible implementation, the method further includes: sending, by the first communications device, switching information to a third communications device, where the switching information is used to instruct the third communications device to send the $i^{th}$ data packet to the second communications device; the switching information includes at least one of a sequence number of the $i^{th}$ data packet, a rule for the fountain-code encoding, and an encoding context; the rule for the fountain-code encoding includes at least one of a length of the $i^{th}$ data packet, a quantity $N_i$ of the $N_i$ data blocks, and an encoding matrix; the encoding matrix is used to indicate a mapping relationship between the data blocks and the fountain-code codewords; and the encoding context is used to indicate at least one of information such as a quantity of generated codes and a status of the encoding matrix; and sending, by the first communications device, the $i^{th}$ data packet or the to-be-sent PDU in the $K_i$ PDUs to the third communications device.

In a possible implementation, the first communications device and the second communications device perform data transmission through forwarding by a fourth communications device; and after the first communications device receives the first acknowledgement information sent by the second communications device, the method further includes: sending, by the first communications device, transmission stop information to the fourth communications device, where the transmission stop information is used to instruct the fourth communications device to discard a PDU in the $K_i$ PDUs that has been stored.

In a possible implementation, the method further includes: receiving, by the first communications device, link status information sent by the second communications device, where the link status information is used to indicate a quantity of PDUs received by the second communications device on at least one link, or a data receiving status in a preset time period; and adjusting, by the first communications device, an offloading policy based on the link status information.

In a possible implementation, the method further includes: sending, by the first communications device, configuration information of the first communications device to the second communications device, where the configuration information of the first communications device includes at least one of capability information of the first communications device and the rule for the fountain-code encoding; and the capability information of the first communications device is used to indicate at least one of support of the first communications device for a fountain code, a fountain-code type supported by the first communications device, and a maximum encoding length of the first communications device; the rule for the fountain-code encoding includes at least one of the length of the $i^{th}$ data packet, the quantity $N_i$ of the $N_i$ data blocks, and the encoding matrix; and the encoding matrix is used to indicate the mapping relationship between the data blocks and the fountain-code codewords.

In a possible implementation, an $m^{th}$ PDU in the $K_i$ PDUs includes at least one of a sequence number m of an $m^{th}$ fountain-code codeword and a length of a last data block in the $m^{th}$ PDU, where m is any positive integer ranging from 1 to $K_i$.

According to a second aspect, the present disclosure provides a data transmission method. The method includes receiving, by a second communications device, $K_i$ protocol data units (PDUs) sent by a first communications device, where $K_i$ is an integer greater than 1. The method also includes obtaining, by the second communications device, $T_i$ fountain-code codewords based on received $T_i$ PDUs in the $K_i$ PDUs, where $T_i$ is any integer in $[1, K_i]$. The method also includes performing, by the second communications device, fountain-code decoding on the $T_i$ fountain-code codewords. The method also includes sending, by the second communications device, first acknowledgement information to the first communications device when the second communications device obtains an $i^{th}$ data packet in S data packets by performing fountain-code decoding on the $T_i$ fountain-code codewords, where the first acknowledgement information is used to indicate that the second communications device has correctly received the $i^{th}$ data packet, where S is a positive integer, and a value of i is any positive integer ranging from 1 to S.

For example, the $K_i$ PDUs are generated based on $K_i$ fountain-code codewords, the $K_i$ fountain-code codewords are obtained by performing fountain-code encoding on $N_i$ data blocks, the $N_i$ data blocks constitute the $i^{th}$ data packet, and an $m^{th}$ fountain-code codeword in the $K_i$ fountain-code codewords is corresponding to an $m^{th}$ PDU in the $K_i$ PDUs, where m is an integer in an interval $[1, K_i]$. The first acknowledgement information is sent by the second communications device after the second communications device receives the $T_i$ PDUs, where $T_i$ is an integer in $[1, K_i]$, and $T_i$ is a quantity of PDUs, in the $K_i$ PDUs, that are received by the second communications device.

It should be noted that the receiving by the second communications device herein is merely a continuous action, and does not mean that all the $K_i$ PDUs are received.

For example, the first communications device is a base station eNB, and the second communications device is user equipment UE; or the first communications device is UE, and the second communications device is an eNB. The $i^{th}$ data packet is a Radio Link Control (RLC) layer data packet, or the $i^{th}$ data packet is a Packet Data Convergence Protocol (PDCP) layer data packet.

Optionally, using a data packet as an example, the $i^{th}$ data packet may be a large data packet constituted by a plurality of data packets in a concatenation manner.

In a possible implementation, a total length of the S data packets is less than or equal to a length of a preset window, the preset window is used to indicate that data packets sent by the first communications device are a first data packet to an $S^{th}$ data packet in the S data packets, and the method further includes: receiving, by the second communications device, $K_{i+1}$ PDUs sent by the first communications device, where the $K_{i+1}$ PDUs are generated based on $K_{i+1}$ fountain-code codewords, the $K_{i+1}$ fountain-code codewords are generated based on $N_{i+1}$, data blocks, the $N_{i+1}$ data blocks constitute an $(i+1)^{th}$ data packet in the S data packets, $N_{i+1}$ is an integer greater than 1, and $K_{i+1}$ is an integer greater than 1; obtaining, by the second communications device, $T_{i+1}$ fountain-code codewords based on received $T_{i+1}$ PDUs in the $K_{i+1}$ PDUs, where $T_{i+1}$ is an integer in $[1, K_{i+1}]$; and performing, by the second communications device, fountain-code decoding on the $T_{i+1}$ fountain-code codewords.

In a possible implementation, the method further includes: sending, by the second communications device, second status information to the first communications device, where the second status information is used to indicate a quantity of PDUs, of the $(i+1)^{th}$ data packet in the S data packets, that are correctly received by the second communications device, so that the first communications device adjusts, based on the second status information, at least one of a sending quantity and a second rate for sending a PDU in the $(i+1)^{th}$ data packet.

In a possible implementation, the sending, by the second communications device, second status information to the first communications device includes: when duration occupied by PDUs that have been received by the second communications device exceeds second preset duration, sending, by the second communications device, the second status information to the first communications device.

In a possible implementation, the first communications device and the second communications device perform data transmission through forwarding by a fourth communications device; and after the sending, by the second communications device, first acknowledgement information to the first communications device, the method further includes: sending, by the second communications device, transmission stop information to the fourth communications device, where the transmission stop information is used to instruct the fourth communications device to discard a PDU in the $K_i$ PDUs that has been stored.

In a possible implementation, the method further includes: sending, by the second communications device, link status information to the first communications device, where the link status information is used to indicate a quantity of PDUs received by the second communications device on at least one link, or a data receiving status in a preset time period.

In a possible implementation, the method further includes: receiving, by the second communications device, configuration information of the first communications device that is sent by the first communications device, where the configuration information of the first communications device includes at least one of capability information of the first communications device and a rule for fountain-code encoding; and the capability information of the first communications device is used to indicate at least one of support of the first communications device for a fountain code, a fountain-code type supported by the first communications device, and a maximum encoding length of the first communications device; the rule for the fountain-code encoding includes at least one of the length of the $i^{th}$ data packet, the quantity $N_i$ of the $N_i$ data blocks, and the encoding matrix; and the encoding matrix is used to indicate the mapping relationship between the data blocks and the fountain-code codewords.

In a possible implementation, an $m^{th}$ PDU in the $K_i$ PDUs includes at least one of a sequence number m of an $m^{th}$ fountain-code codeword and a length of a last data block in the $m^{th}$ PDU, where m is any positive integer ranging from 1 to $K_i$.

According to a third aspect, the present disclosure provides a first communications device. The device includes an obtaining unit, configured to obtain an $i^{th}$ data packet in S data packets, where S is a positive integer, and a value of i is any positive integer ranging from 1 to S. The device also includes an encoding unit, configured to divide the $i^{th}$ data packet into $N_i$ data blocks, and perform fountain-code encoding on the $N_i$ data blocks to generate $K_i$ fountain-code codewords, where $N_i$ is an integer greater than 1, and $K_i$ is an integer greater than 1. The device also includes a data processing unit, configured to generate $K_i$ protocol data units (PDUs) based on the $K_i$ fountain-code codewords. The device also includes a sending unit, configured to send the $K_i$ PDUs to a second communications device, where the first communications device further includes a receiving unit. The sending unit is further configured to: when the receiving unit receives first acknowledgement information sent by the second communications device, stop, based on the first acknowledgement information, sending a to-be-sent PDU in the $K_i$ PDUs to the second communications device, where the first acknowledgement information is used to indicate that the second communications device has correctly received the $i^{th}$ data packet.

In a possible implementation, a total length of the S data packets is less than or equal to a length of a preset window, and the preset window is used to indicate that data packets sent by the first communications device are a first data packet to an $S^{th}$ data packet in the S data packets; the encoding unit is further configured to divide an $(i+1)^{th}$ data packet in the S data packets into $N_{i+1}$ data blocks, and perform fountain-code encoding on the $N_{i+1}$ data blocks to generate $K_{i+1}$ fountain-code codewords, where $N_{i+1}$ is an integer greater than 1, and $K_{i+1}$ is an integer greater than 1; the data processing unit is further configured to generate $K_{i+1}$ PDUs based on the $K_{i+1}$ fountain-code codewords; and the sending unit is further configured to send the $K_{i+1}$ PDUs to the second communications device.

In a possible implementation, the data processing unit is further configured to: after the receiving unit receives the first acknowledgement information sent by the second communications device, when the value of i is 1, adjust the data packets indicated by the preset window to a second data packet to an $(S+1)^{th}$ data packet.

In a possible implementation, when duration occupied by PDUs, in the $K_i$ PDUs, that have been sent by the first communications device to the second communications device exceeds first preset duration, or when a quantity of PDUs, in the $K_i$ PDUs, that have been sent by the first communications device to the second communications device exceeds a preset quantity, the obtaining unit is further configured to discard the $i^{th}$ data packet; and the data processing unit is further configured to: when the value of i is 1, adjust the data packets indicated by the preset window to the second data packet to the $(S+1)^{th}$ data packet.

In a possible implementation, the receiving unit is further configured to receive second status information sent by the second communications device, where the second status information is used to indicate a quantity of PDUs, of the $(i+1)^{th}$ data packet in the S data packets, that are correctly received by the second communications device; and the sending unit is further configured to adjust, based on the second status information, at least one of a sending quantity and a sending rate for sending a PDU of the $(i+1)^{th}$ data packet.

In a possible implementation, the receiving unit is further configured to: when duration occupied by PDUs that have been received by the second communications device exceeds second preset duration, receive the second status information sent by the second communications device.

In a possible implementation, the sending unit is further configured to send switching information to a third communications device, where the switching information is used to instruct the third communications device to send the $i^{th}$ data packet to the second communications device; the switching information includes at least one of a sequence number of the $i^{th}$ data packet, a rule for the fountain-code encoding, and an encoding context; the rule for the fountain-code encoding includes at least one of a length of the $i^{th}$ data packet, a quantity $N_i$ of the $N_i$ data blocks, and an encoding matrix; the encoding matrix is used to indicate a mapping relationship between the data blocks and the fountain-code codewords; and the encoding context is used to indicate at least one of information such as a quantity of generated codes and a status of the encoding matrix; and the sending unit is further configured to send the $i^{th}$ data packet or the to-be-sent PDU in the $K_i$ PDUs to the third communications device.

In a possible implementation, the first communications device and the second communications device perform data transmission through forwarding by a fourth communications device; and the sending unit is further configured to send transmission stop information to the fourth communications device, where the transmission stop information is used to instruct the fourth communications device to discard a PDU in the $K_i$ PDUs that has been stored.

In a possible implementation, the receiving unit is further configured to receive link status information sent by the second communications device, where the link status information is used to indicate a quantity of PDUs received by the second communications device on at least one link, or a data receiving status in a preset time period; and the sending unit is further configured to adjust an offloading policy based on the link status information received by the receiving unit.

In a possible implementation, the sending unit is further configured to send configuration information of the first communications device to the second communications device, where the configuration information of the first communications device includes at least one of capability information of the first communications device and the rule for the fountain-code encoding; and the capability information of the first communications device is used to indicate at least one of support of the first communications device for a fountain code, a fountain-code type supported by the first communications device, and a maximum encoding length of the first communications device; the rule for the fountain-code encoding includes at least one of the length of the $i^{th}$ data packet, the quantity $N_i$ of the $N_i$ data blocks, and the encoding matrix; and the encoding matrix is used to indicate the mapping relationship between the data blocks and the fountain-code codewords.

In a possible implementation, an $m^{th}$ PDU in the $K_i$ PDUs includes at least one of a sequence number m of an $m^{th}$ fountain-code codeword and a length of a last data block in the $m^{th}$ PDU, where m is any positive integer ranging from 1 to $K_i$.

According to a fourth aspect, the present disclosure provides a second communications device. The device includes a receiving unit, configured to receive $K_i$ protocol data units (PDUs) sent by a first communications device, where $K_i$ is an integer greater than 1. The device also includes a data processing unit, configured to obtain $T_i$ fountain-code codewords based on received $T_i$ PDUs in the $K_i$ PDUs, where $T_i$ is any integer in $[1, K_i]$. The device also includes a decoding unit, configured to perform fountain-code decoding on the $T_i$ fountain-code codewords. The device also includes a sending unit, configured to send first acknowledgement information to the first communications device when the decoding unit obtains an $i^{th}$ data packet in S data packets by performing fountain-code decoding on the $T_i$ fountain-code codewords, where the first acknowledgement information is used to indicate that the second communications device has correctly received the $i^{th}$ data packet, where S is a positive integer, and a value of i is any positive integer ranging from 1 to S.

In a possible implementation, a total length of the S data packets is less than or equal to a length of a preset window, and the preset window is used to indicate that data packets sent by the first communications device are a first data packet to an $S^{th}$ data packet in the S data packets; the receiving unit is further configured to receive $K_{i+1}$ PDUs sent by the first communications device, where the $K_{i+1}$ PDUs are generated based on $K_{i+1}$ fountain-code codewords, the $K_{i+1}$ fountain-code codewords are generated based on $N_{i+1}$ data blocks, the $N_{i+1}$ data blocks constitute an $(i+1)^{th}$ data packet in the S data packets, $N_{i+1}$ is an integer greater than 1, and $K_{i+1}$ is an integer greater than 1; the data processing unit is further configured to obtain $T_{i+1}$ fountain-code codewords based on received $T_{i+1}$ PDUs in the $K_{i+1}$ PDUs, where $T_{i+1}$ is an integer in $[1, K_{i+1}]$; and the decoding unit is further configured to perform fountain-code decoding on the $T_{i+1}$ fountain-code codewords.

In a possible implementation, the sending unit is further configured to send second status information to the first communications device, where the second status information is used to indicate a quantity of PDUs, of the $(i+1)^{th}$ data packet in the S data packets, that are correctly received by the second communications device, so that the first communications device adjusts, based on the second status information, at least one of a sending quantity and a second rate for sending a PDU in the $(i+1)^{th}$ data packet.

In a possible implementation, the sending unit is further configured to: when duration occupied by PDUs that have been received by the second communications device exceeds second preset duration, send the second status information to the first communications device.

In a possible implementation, the first communications device and the second communications device perform data transmission through forwarding by a fourth communications device; and the sending unit is further configured to send transmission stop information to the fourth communications device, where the transmission stop information is used to instruct the fourth communications device to discard a PDU in the $K_i$ PDUs that has been stored.

In a possible implementation, the sending unit is further configured to send link status information to the first communications device, where the link status information is used to indicate a quantity of PDUs received by the second communications device on at least one link, or a data receiving status in a preset time period.

In a possible implementation, the receiving unit is further configured to receive configuration information of the first communications device that is sent by the first communications device, where the configuration information of the first communications device includes at least one of capability information of the first communications device and a rule for fountain-code encoding; and the capability information of the first communications device is used to indicate at least one of support of the first communications device for a fountain code, a fountain-code type supported by the first communications device, and a maximum encoding length of the first communications device; the rule for the fountain-code encoding includes at least one of the length of the $i^{th}$ data packet, the quantity $N_i$ of the $N_i$ data blocks, and the encoding matrix; and the encoding matrix is used to indicate a mapping relationship between the data blocks and the fountain-code codewords.

In a possible implementation, an $m^{th}$ PDU in the $K_i$ PDUs includes at least one of a sequence number m of an $m^{th}$ fountain-code codeword and a length of a last data block in the $m^{th}$ PDU, where m is any positive integer ranging from 1 to $K_i$.

According to a seventh aspect, the present disclosure provides a data transmission system, including a first communications device and a second communications device, where the first communications device is the first communications device described in any one of the third aspect or the possible implementations of the third aspect, and the second communications device is the second communications device described in any one of the fourth aspect or the possible implementations of the fourth aspect.

According to the data transmission method, device, and system provided in the present disclosure, the first communications device obtains the $i^{th}$ data packet in the S data packets, divides the $i^{th}$ data packet into the $N_i$ data blocks, performs fountain-code encoding on the $N_i$ data blocks to generate the $K_i$ fountain-code codewords, generates the $K_i$ protocol data units (PDUs) based on the $K_i$ fountain-code codewords, and sends the $K_i$ PDUs to the second communications device; and when receiving the first acknowledgement information sent by the second communications device, the first communications device stops, based on the first acknowledgement information, sending a to-be-sent PDU in the $K_i$ PDUs to the second communications device, where the first acknowledgement information is used to indicate that the second communications device has correctly received the $i^{th}$ data packet. In this way, the second communications device sends feedback information to the first communications device after correctly receiving the $i^{th}$ data packet, and does not need to feed back a receiving status of each PDU. This greatly reduces feedback information, saves network resources, and resolves the problem that, when data transmission is performed in a wireless communications network, ACK information or NACK information occupies excessive network resources, thereby affecting data transmission efficiency of a system. Further, the first communications device may simultaneously send a plurality of data packets to the second communications device by using a fountain code. This implements multi-process data transmission, improves data transmission efficiency of a wireless network communications system, and resolves a problem that data transmission efficiency of a wireless network communications system is low.

It should be understood that the foregoing general descriptions and the following detailed descriptions are merely examples and interpretations, and do not constitute any limitation on the present disclosure.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

The foregoing accompanying drawings show specific embodiments of the present disclosure, and more detailed descriptions are provided in the following. The accompanying drawings and text descriptions are not intended to limit the scope of the idea of the present disclosure in any manner, but are intended to describe the concept of the present disclosure to persons skilled in the art with reference to particular embodiments.

DETAILED DESCRIPTION OF ILLUSTRATIVE EMBODIMENTS

To make the objectives, technical solutions, and advantages of the present disclosure clearer, the following further describes the implementations of the present disclosure in detail with reference to the accompanying drawings.

Figure 1:
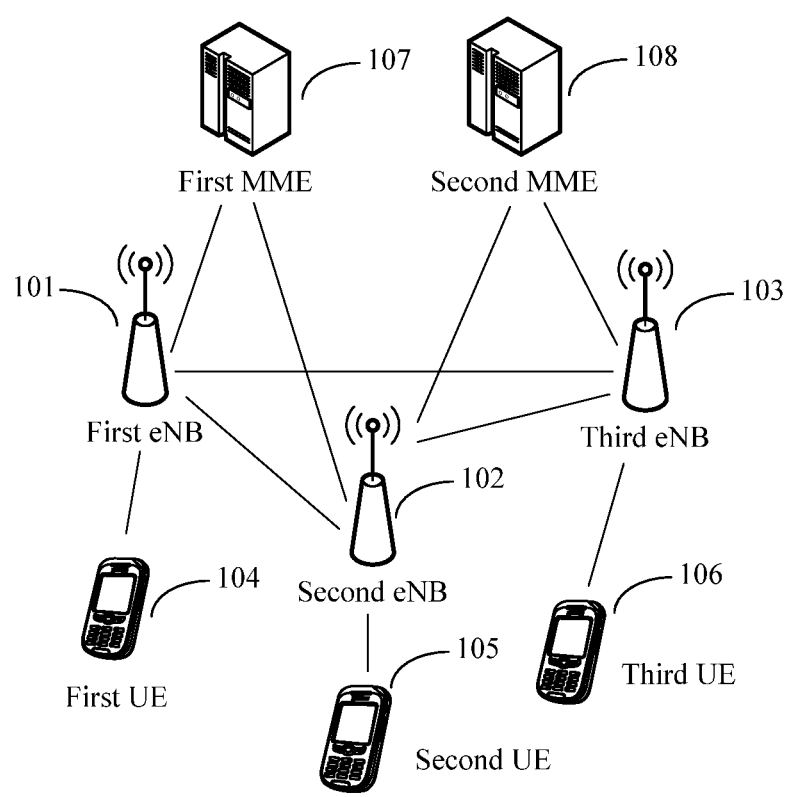
FIG. 1 is a schematic structural diagram of a wireless network communications system according to an embodiment of the present disclosure.

A data transmission method and device provided in the embodiments of the present disclosure may be applied to a wireless network communications system, such as a Universal Mobile Telecommunications System (UMTS), a Code Division Multiple Access (CDMA) system, a Global System for Mobile Communications (GSM), a Wireless Fidelity (Wi-Fi) system, or a Long Term Evolution (LTE) system. Using the LTE system as an example, an embodiment of the present disclosure provides a wireless network communications system. As shown in FIG. 1, the wireless network communications system 10 includes a first evolved NodeB (eNB) 101, a second eNB 102, a third eNB 103, first UE (user equipment) 104, second UE 105, third UE 106, a first mobility management entity (MME) 107, and a second MME 108. The data transmission method provided in the present disclosure may be used for data transmission between the communications devices in the wireless network communications system 10, for example, between an MME and an eNB, between an eNB and UE, and between eNBs. Certainly, herein are merely examples for description, and it does not mean that the present disclosure is limited thereto. The MME may also be a serving gateway (S-GW). The wireless network communications system 10 may further include another communications device. Merely several common network devices are listed herein for description. The data transmission method provided in the embodiments of the present disclosure is also applicable to other communications systems. For example, in a 3rd Generation (3G) mobile communications system, the data transmission method provided in the embodiments of the present disclosure may be used for data transmission between a core network (CN), a radio network controller (RNC), and UE; in a 2nd Generation (2G) mobile communications system, the data transmission method provided in the embodiments of the present disclosure may be used for data transmission between a CN, a base transceiver station (BTS), and UE; and in a Wi-Fi system, the data transmission method provided in the embodiments of the present disclosure may be used for data transmission between an access point (AP) and a station.

Figure 2:
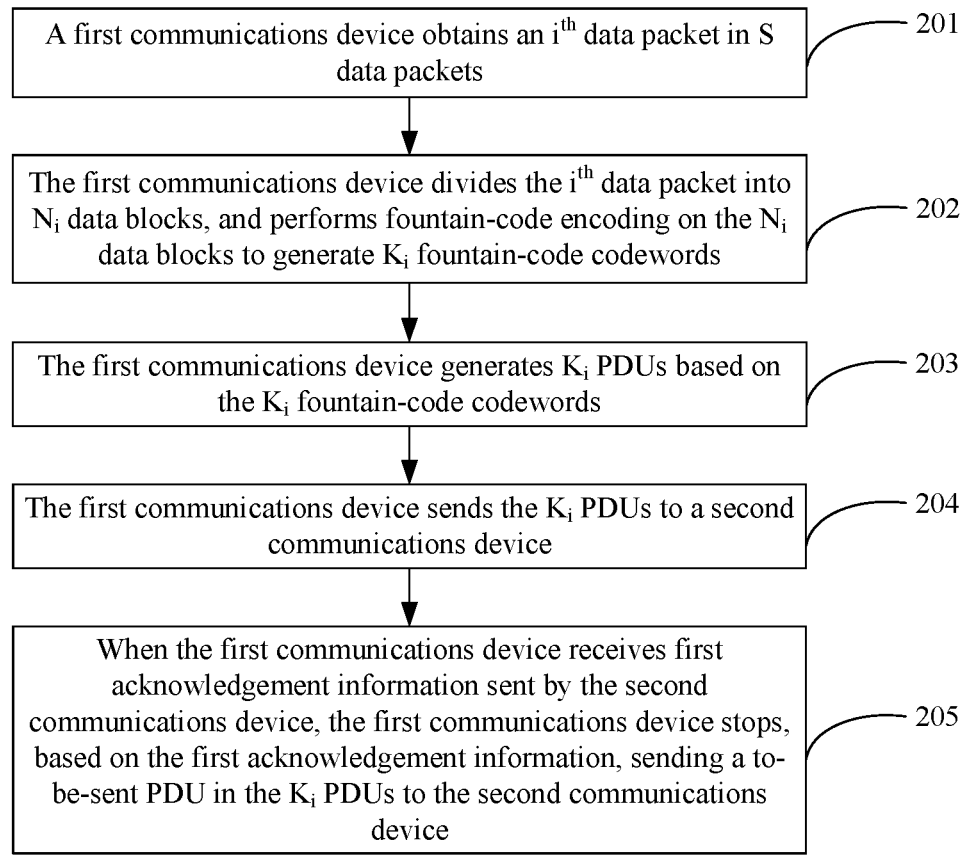
FIG. 2 is a schematic flowchart of a data transmission method according to an embodiment of the present disclosure.

An embodiment of the present disclosure provides a data transmission method. The data transmission method is applied to a first communications device, and the first communications device is a transmit-side device in data transmission. Preferably, in the wireless network communications system 10 shown in FIG. 1, the first communications device may be any one of an MME, an eNB, or UE. Referring to FIG. 2, the data transmission method provided in this embodiment includes the following steps.

201. The first communications device obtains an $i^{th}$ data packet in S data packets.

S is a positive integer, and a value of i is any positive integer ranging from 1 to S. Optionally, the $i^{th}$ data packet may include one or more data packets, one or more messages, one or more data frames, or one or more data segments. The data packet has different forms in different transmission scenarios. This is not limited in the present disclosure. Optionally, using a data packet as an example, the $i^{th}$ data packet may be a large data packet constituted by a plurality of data packets in a concatenation manner.

Preferably, the data transmission method provided in this embodiment may be used for data transmission at a Radio Link Control (RLC) layer or a Packet Data Convergence Protocol (PDCP) layer.

202. The first communications device divides the $i^{th}$ data packet into $N_i$ data blocks, and performs fountain-code encoding on the $N_i$ data blocks to generate $K_i$ fountain-code codewords.

Figure 3:
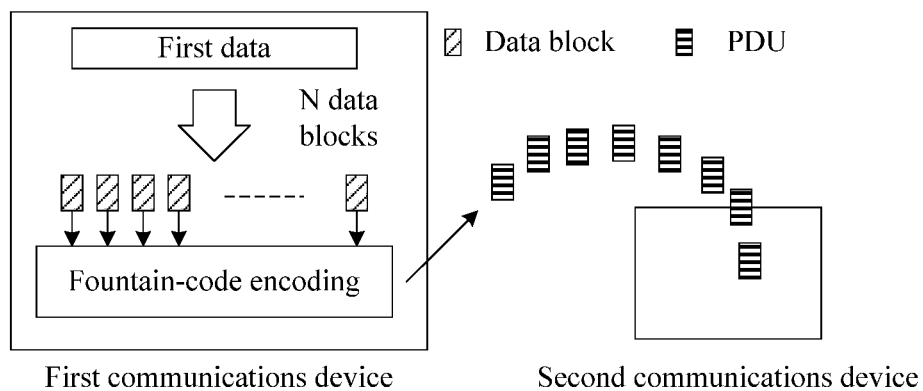
FIG. 3 is a schematic diagram of a fountain-code encoding principle according to an embodiment of the present disclosure.

$N_i$ is an integer greater than 1, and $K_i$ is an integer greater than 1. Specifically, a fountain code principle is shown in FIG. 3. In FIG. 3, an example in which the $i^{th}$ data packet is one data packet is used. The $i^{th}$ data packet is divided into $N_i$ data blocks. A plurality of data blocks are randomly selected from the $N_i$ data blocks, and are encoded to generate one fountain-code codeword. Encoding is continuously performed in such a way, and codewords are continuously generated and sent. After receiving a codeword, a second communications device (a second communications device in this embodiment) performs decoding to obtain an original data block. When a specific quantity of codewords are received, the second communications device may obtain all of the $N_i$ data blocks and therefore obtain an original data packet (namely, the $i^{th}$ data packet in this embodiment). During encoding, a plurality of data blocks are randomly selected from the $N_i$ data blocks for encoding. Therefore, even if several codewords are lost in a transmission process, an entire decoding process is not affected because new codewords may be further received subsequently. This transmission mode has a relatively high error tolerance rate.

Optionally, an example in which a value of $N_i$ is 10 is used for description. Fountain-code encoding and decoding processes are as follows.

The first communications device receives a data packet, and equally divides the data packet into 10 blocks, where numbers of the data blocks are 1, 2, . . . , and 10; and performs fountain-code encoding on the 10 data blocks, for example, performs an exclusive OR operation on a first data block and a second data block to obtain a fountain-code codeword 1, and performs an exclusive OR operation on a third data block, a fifth data block, and a tenth data block to obtain a fountain-code codeword 2. Information about selecting a plurality of data blocks to perform an operation such as exclusive OR is referred to as an encoding matrix, and may be represented by using a random sequence. On the second communications device side, a data block may be restored by performing an inverse operation of the encoding matrix on a fountain-code codeword. For example, if a data block 1 is obtained, an exclusive OR operation may be performed on the data block 1 and the fountain-code codeword 1 for decoding, and a data block 2 may be obtained. Provided that a sufficient quantity of fountain-code codewords are obtained, a decoding operation may be performed to obtain all the 10 data blocks.

203: The first communications device generates $K_i$ protocol data units (PDU) based on the $K_i$ fountain-code codewords.

An $m^{th}$ fountain-code codeword in the $K_i$ fountain-code codewords is corresponding to an $m^{th}$ PDU in the $K_i$ PDUs, where m is an integer in an interval $[1, K_i]$.

Optionally, a PDU also has different data forms in different transmission scenarios. For example, a PDU at a physical layer is a data bit, a PDU at a data link layer is a data frame, a PDU at a network layer is a data packet, a PDU at a transport layer is a data segment, a PDU at a higher layer is a message, and so on.

In different transmission scenarios, a PDU may be generated in different manners. For example, at the PDCP layer, PDCP layer processing, such as encryption, integrity protection, and header adding, needs to be separately performed on the $K_i$ fountain-code codewords. Optionally, the $m^{th}$ PDU in the $K_i$ PDUs includes at least one of a sequence number m of the $m^{th}$ fountain-code codeword and a length of a last data block in the $m^{th}$ PDU. Specifically, optionally, the sequence number m of the $m^{th}$ fountain-code codeword and the length of the last data block in the $m^{th}$ PDU may be placed in a header of the $m^{th}$ PDU. In addition, optionally, a rule for the fountain-code encoding may be further carried in the header of the $m^{th}$ PDU. The rule for the fountain-code encoding may include at least one of a length of a to-be-encoded data (a length of the $i^{th}$ data packet in this embodiment), a quantity of blocks obtained through division (a quantity of the $N_i$ data blocks in this embodiment), and an encoding matrix. The encoding matrix is a mapping relationship between a source codeword and a target codeword, namely, a mapping relationship between the data blocks and the fountain-code codewords in this embodiment.

204: The first communications device sends the $K_i$ PDUs to a second communications device.

Optionally, in a process of generating the $K_i$ fountain-code codewords, generating the $K_i$ PDUs, and sending the $K_i$ PDUs by the first communications device, the operations may be performed asynchronously or synchronously. When the operations are performed asynchronously, the $K_i$ fountain-code codewords may be sequentially generated, then the $K_i$ PDUs are sequentially generated based on the generated $K_i$ fountain-code codewords, and then the generated $K_i$ PDUs are sequentially sent to the second communications device. When the operations are performed synchronously, the $K_i$ fountain-code codewords may be sequentially generated; the $K_i$ PDUs are sequentially generated; after a first fountain-code codeword is generated, a first PDU is generated based on the first fountain-code codeword, and a second fountain-code codeword is generated at the same time; and when the first PDU is sent, a second PDU is generated based on the second fountain-code codeword at the same time, in other words, the three operations of generating a fountain-code codeword, generating a PDU, and sending the PDU are performed simultaneously. Certainly, herein are merely examples for description, and it does not mean that the present disclosure is limited thereto.

Optionally, when the first communications device transmits data to the second communications device by using a plurality of links, the first communications device may further receive link status information sent by the second communications device, where the link status information is used to indicate a quantity of PDUs received by the second communications device on at least one link, or a data receiving status in a preset time period. The first communications device may adjust an offloading policy based on the link status information.

205: When the first communications device receives first acknowledgement information sent by the second communications device, the first communications device stops, based on the first acknowledgement information, sending a to-be-sent PDU in the $K_i$ PDUs to the second communications device.

Preferably, the first acknowledgement information is sent by the second communications device after the second communications device receives $T_i$ PDUs, and is used to indicate that the second communications device has correctly received the $i^{th}$ data packet. $T_i$ is an integer in $[1, K_i]$, and $T_i$ is a quantity of PDUs, in the $K_i$ PDUs, that are received by the second communications device.

Preferably, with reference to step S204, that the first communications device sends the $K_i$ PDUs to the second communications device indicates merely that the first communications device starts to perform an action of sending the $K_i$ PDUs to the second communications device, but does not indicate a complete process from a time at which the first communications device starts to send the $K_i$ PDUs to the second communications device to a time at which sending of the $K_i$ PDUs is completed.

It should be noted that step 205 is a case in which the $i^{th}$ data packet is correctly received by the second communications device. In an actual implementation process, an exception may occur. In this case, transmission of the $i^{th}$ data packet is stopped. For example, when duration occupied by PDUs, in the $K_i$ PDUs, that have been sent by the first communications device to the second communications device exceeds first preset duration, or when a quantity of PDUs, in the $K_i$ PDUs, that have been sent by the first communications device to the second communications device exceeds a preset quantity, the first communications device stops sending a to-be-sent PDU in the $K_i$ PDUs to the second communications device. In an application scenario, if the first communications device receives NACK information sent by the second communications device, the first communications device may continue to send a PDU, and stop sending when the duration occupied by the PDUs, in the $K_i$ PDUs, that have been sent by the first communications device to the second communications device exceeds the first preset duration, or when the quantity of PDUs, in the $K_i$ PDUs, that have been sent by the first communications device to the second communications device exceeds the preset quantity.

With reference to the fountain code principle shown in FIG. 3, after receiving several PDUs, the second communications device may obtain the complete $i^{th}$ data packet through decoding. In this case, the first communications device may stop sending a to-be-sent PDU in the $K_i$ PDUs to the second communications device. A quantity of PDUs received by the second communications device is not fixed, because during the fountain-code encoding, a plurality of data blocks are randomly selected from the $N_i$ data blocks to perform encoding. In this way, the second communications device needs to send feedback information to the first communications device only after obtaining the complete $i^{th}$ data packet, and does not need to feed back a receiving status of each PDU after generating a plurality of PDUs based on the $i^{th}$ data packet and sending the PDUs. This greatly reduces feedback information, and saves network resources.

In addition, optionally, the first communications device may send configuration information of the first communications device to the second communications device, where the configuration information of the first communications device includes at least one of capability information of the first communications device and the rule for the fountain-code encoding. Preferably, the first communications device may send the configuration information of the first communications device to the second communications device in a broadcast manner.

The capability information of the first communications device is used to indicate at least one of support of the first communications device for a fountain code, a fountain-code type supported by the first communications device, and a maximum encoding length of the first communications device. The rule for the fountain-code encoding includes at least one of the length of the $i^{th}$ data packet, the quantity $N_i$ of the $N_i$ data blocks, and the encoding matrix. The encoding matrix is used to indicate the mapping relationship between the data blocks and the fountain-code codewords.

According to the data transmission method provided in this embodiment, the first communications device obtains the $i^{th}$ data packet in the S data packets, divides the $i^{th}$ data packet into the $N_i$ data blocks, performs fountain-code encoding on the $N_i$ data blocks to generate the $K_i$ fountain-code codewords, generates the $K_i$ protocol data units (PDUs) based on the $K_i$ fountain-code codewords, sends the $K_i$ PDUs to the second communications device, and when receiving the first acknowledgement information sent by the second communications device, stops, based on the first acknowledgement information, sending the to-be-sent PDU in the $K_i$ PDUs to the second communications device. In this way, the second communications device needs to send feedback information to the first communications device only after obtaining the complete $i^{th}$ data packet, and does not need to feed back a receiving status of each PDU. This greatly reduces feedback information, saves network resources, and resolves a problem that, when data transmission is performed in a wireless communications network, ACK information or NACK information occupies excessive network resources, thereby affecting data transmission efficiency of a system.

Based on the data transmission method described in the embodiment corresponding to FIG. 1, an embodiment of the present disclosure provides another data transmission method. The data transmission method is applied to the transmit-side entity, namely, the first communications device, in the data transmission method in the embodiment corresponding to FIG. 1. According to the data transmission method provided in this embodiment, multi-process data transmission may be implemented when the data transmission method described in the embodiment corresponding to FIG. 1 is performed. This embodiment is described by using data packet transmission as an example.

Figure 4:
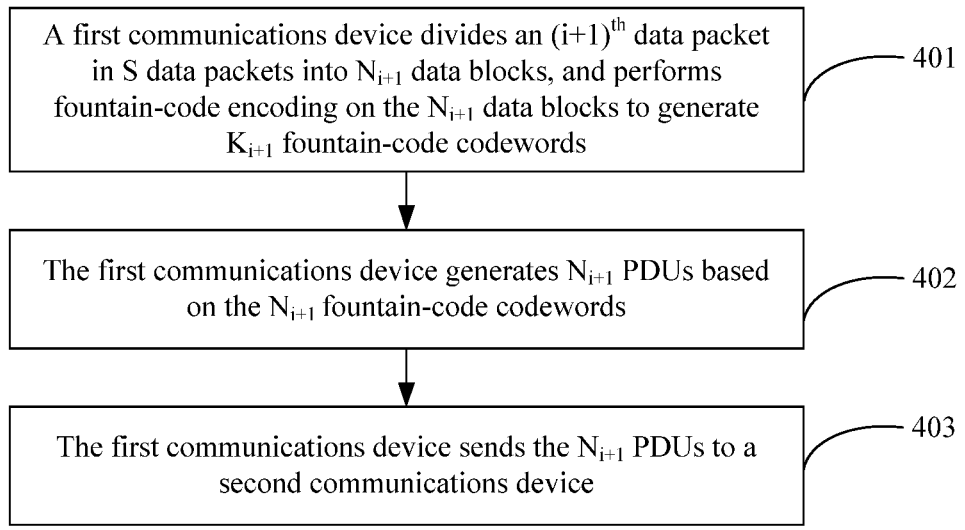
FIG. 4 is a schematic flowchart of another data transmission method according to an embodiment of the present disclosure.

Specifically, a total length of S data packets is less than or equal to a length of a preset window, and the preset window is used to indicate that data packets sent by the first communications device are a first data packet to an $S^{th}$ data packet in the S data packets. Optionally, the length of the preset window may be autonomously adjusted. This embodiment is described by using an example in which the length of the preset window is the length of the S data packets. Further, each of the S data packets may be a fixed-length data packet obtained after a plurality of data units are concatenated, and may use a same rule for fountain-code encoding. Referring to FIG. 4, after the first communications device divides an $i^{th}$ data packet into $N_i$ data blocks, the data transmission method provided in this embodiment includes the following steps.

401: The first communications device divides an $(i+1)^{th}$ data packet in the S data packets into $N_{i+1}$ data blocks, and performs fountain-code encoding on the $N_{i+1}$ data blocks to generate $K_{i+1}$ fountain-code codewords.

$N_{i+1}$ is an integer greater than 1, and $K_{i+1}$ is an integer greater than 1.

402: The first communications device generates $K_{i+1}$ PDUs based on the $K_{i+1}$ fountain-code codewords.

403: The first communications device sends the $N_{i+1}$ PDUs to a second communications device.

It should be noted that, in a process of performing steps 401 to 403, the first communications device sequentially performs operations of steps 401 to 403 on each of the S data packets. Processing processes of the data packets are independent of each other. After a data packet is divided into a plurality of data blocks, a next data packet may be processed. In this way, a plurality of data packets may be simultaneously transmitted in a length of a preset window.

The preset window may be shifted to the right during data transmission. Three possible implementations are listed in this embodiment.

Optionally, after the first communications device receives first acknowledgement information sent by the second communications device, when a value of i is 1, the first communications device adjusts data packets indicated by the preset window to a second data packet to an $(S+1)^{th}$ data packet.

Alternatively, optionally, the first communications device discards the $i^{th}$ data packet when duration occupied by PDUs, in $K_i$ PDUs, that have been sent by the first communications device to the second communications device exceeds first preset duration, or when a quantity of PDUs, in $K_i$ PDUs, that have been sent by the first communications device to the second communications device exceeds a preset quantity. When the value of i is 1, the first communications device adjusts the data packets indicated by the preset window to the second data packet to the $(S+1)^{th}$ data packet.

Figure 5:
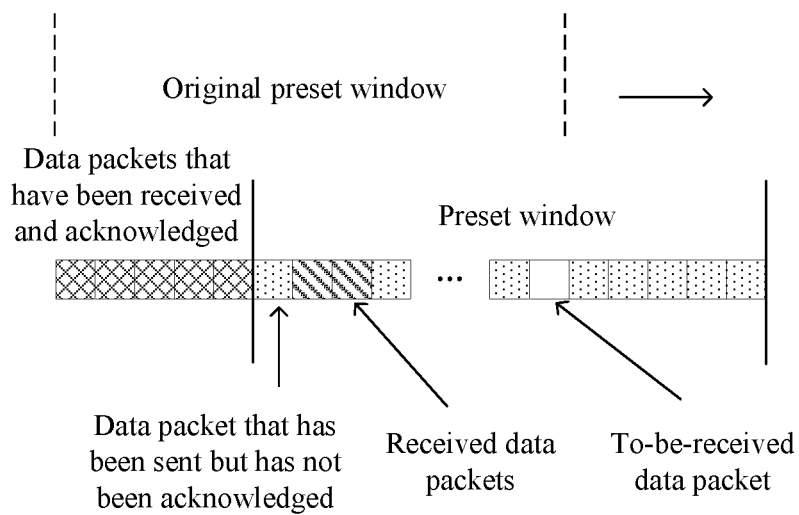
FIG. 5 is a schematic diagram of a migration effect of a preset window according to an embodiment of the present disclosure.

Referring to FIG. 5, the preset window indicates that data packets sent by the first communications device are a first data packet to an $S^{th}$ data packet in the S data packets. In the foregoing three possible implementations, when the first data packet is correctly received, or when receiving of the first data packet expires, transmission of the first data packet stops, and the preset window is shifted to the right, and changes to the second data packet to the $(S+1)^{th}$ data packet. In an actual implementation process, each data packet may have a sequence number, to determine a range of the preset window.

Preferably, the data transmission method provided in this embodiment may further include: receiving, by the first communications device, second status information sent by the second communications device, where the second status information is used to indicate a quantity of PDUs, of the $(i+1)^{th}$ data packet in the S data packets, that are correctly received by the second communications device; and adjusting, by the first communications device based on the second status information, at least one of a sending quantity and a sending rate for sending a PDU in the $(i+1)^{th}$ data packet. Optionally, when duration occupied by PDUs that have been received by the second communications device exceeds second preset duration, the first communications device may receive the second status information sent by the second communications device. It should be noted that the second status information may be carried in acknowledgement information or negative acknowledgement information and sent to the first communications device. Certainly, herein are merely examples for description, and it does not mean that the present disclosure is limited thereto.

In a multi-process data transmission scenario, when the second communications device sends feedback information to the first communications device, the feedback information may include status information of at least one another data packet, to indicate a receiving status of the another data packet. In this way, the first communications device may adjust, based on status information of each data packet, at least one of a sending quantity and a sending rate for sending a PDU in each data packet. The sending quantity and the sending rate for each data packet may be separately adjusted based on the status information of each data packet. This reduces redundant PDU transmission of each data packet, and can fully utilize a transmission resource and improve transmission efficiency of a network communications system.

According to the data transmission method provided in this embodiment, the first communications device divides the $(i+1)^{th}$ data packet in the S data packets into the $N_{i+1}$ data blocks, and performs fountain-code encoding on the $N_{i+1}$ data blocks to generate the $K_{i+1}$ fountain-code codewords, where $N_{i+1}$ is an integer greater than 1, and $K_{i+1}$ is an integer greater than 1; and the first communications device generates the $K_{i+1}$ PDUs based on the $K_{i+1}$ fountain-code codewords, and sends the $K_{i+1}$ PDUs to the second communications device. In this way, the first communications device may simultaneously send a plurality of data packets to the second communications device by using a fountain code. This implements multi-process data transmission, improves data transmission efficiency of a wireless network communications system, and resolves a problem that data transmission efficiency of a wireless network communications system is low.

Figure 6:
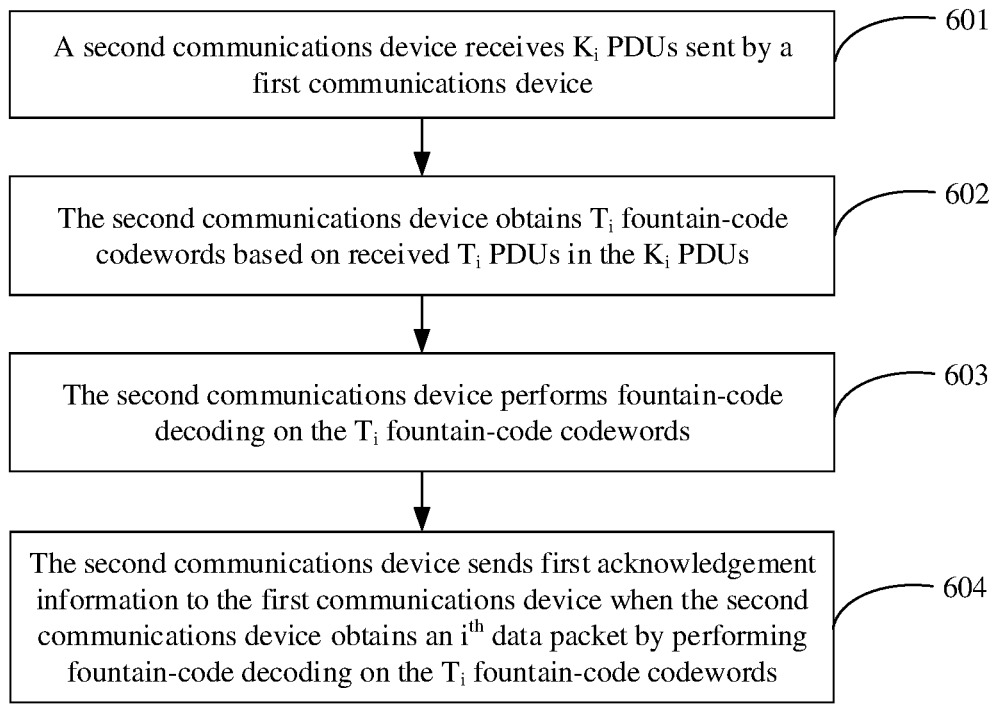
FIG. 6 is a schematic flowchart of a data transmission method according to another embodiment of the present disclosure.

With reference to the embodiment corresponding to FIG. 2, another embodiment of the present disclosure provides a data transmission method. The data transmission method is corresponding to the receive-side method of the data transmission method described in the embodiment corresponding to FIG. 2, and is applied to a second communications device. Preferably, in the wireless network communications system 10 shown in FIG. 1, the second communications device may be any one of an MME, an eNB, or UE. Referring to FIG. 6, the data transmission method provided in this embodiment includes the following steps.

601. The second communications device receives $K_i$ protocol data units (PDUs) sent by a first communications device.

$K_i$ is an integer greater than 1. The $K_i$ PDUs are generated based on $K_i$ fountain-code codewords. An $m^{th}$ fountain-code codeword in the $K_i$ fountain-code codewords is corresponding to an $m^{th}$ PDU in the $K_i$ PDUs. m is an integer in an interval $[1, K_i]$. The $K_i$ fountain-code codewords are obtained by performing fountain-code encoding on $N_i$ data blocks. The $N_i$ data blocks constitute an $i^{th}$ data packet. $N_i$ is an integer greater than 1. Optionally, the $m^{th}$ PDU includes at least one of a sequence number m of the $m^{th}$ fountain-code codeword and a length of a last data block in the $m^{th}$ PDU.

It should be noted that the receiving by the second communications device herein is merely a continuous action, and does not mean that all the $K_i$ PDUs are received.

With reference to the descriptions in the embodiment corresponding to FIG. 2, the second communications device sequentially receives PDUs, and when the $i^{th}$ data packet may be obtained by decoding PDUs received by the second communications device, the second communications device may stop receiving a PDU generated by using the $i^{th}$ data packet.

602. The second communications device obtains $T_i$ fountain-code codewords based on received $T_i$ PDUs in the $K_i$ PDUs.

$T_i$ is an integer in $[1, K_i]$.

It should be noted that, in different transmission scenarios, a PDU may be generated in different manners. For example, at a PDCP layer, PDCP layer processing, such as encryption, integrity protection, and header adding, needs to be separately performed on the $K_i$ fountain-code codewords. Therefore, correspondingly, after receiving a PDU, the second communications device needs to perform processing such as header removal, integrity verification, and decryption. Optionally, the $m^{th}$ PDU includes at least one of the sequence number m of the $m^{th}$ fountain-code codeword and the length of the last data block in the $m^{th}$ PDU. Optionally, the sequence number m of the $m^{th}$ fountain-code codeword and the length of the last data block in the $m^{th}$ PDU may be placed in a header of the $m^{th}$ PDU. In addition, optionally, the rule for the fountain-code encoding may be further carried in the header of the $m^{th}$ PDU. The rule for the fountain-code encoding may include at least one of a length of a to-be-encoded data (a length of the $i^{th}$ data packet in this embodiment), a quantity of blocks obtained through division (a quantity of the $N_i$ data blocks in this embodiment), and an encoding matrix. The encoding matrix is a mapping relationship between a source codeword and a target codeword, namely, a mapping relationship between the data blocks and the fountain-code codewords in this embodiment.

Optionally, when the first communications device transmits data to the second communications device by using a plurality of links, the second communications device may further send link status information to the first communications device, where the link status information is used to indicate a quantity of PDUs received by the second communications device on at least one link, or a data receiving status in a preset time period, so that the first communications device adjusts an offloading policy based on the link status information.

603. The second communications device performs fountain-code decoding on the $T_i$ fountain-code codewords.

604. The second communications device sends first acknowledgement information to the first communications device when the second communications device obtains an $i^{th}$ data packet by performing fountain-code decoding on the $T_i$ fountain-code codewords.

The first acknowledgement information is used to indicate that the second communications device has correctly received the $i^{th}$ data packet.

It should be noted that step 604 is a case in which the $i^{th}$ data packet is correctly received by the second communications device. In an actual implementation process, an exception may occur. When the second communications device cannot correctly receive the $i^{th}$ data packet in a specific time, the second communications device may send NACK information to the first communications device. In addition, optionally, the second communications device may further receive configuration information of the first communications device that is sent by the first communications device, where the configuration information of the first communications device includes at least one of capability information of the first communications device and the rule for the fountain-code encoding. Preferably, the first communications device may send the configuration information of the first communications device to the second communications device in a broadcast manner.

The capability information of the first communications device is used to indicate at least one of support of the first communications device for a fountain code, a fountain-code type supported by the first communications device, and a maximum encoding length of the first communications device. The rule for the fountain-code encoding includes at least one of the length of the $i^{th}$ data packet, the quantity $N_i$ of the $N_i$ data blocks, and the encoding matrix. The encoding matrix is used to indicate the mapping relationship between the data blocks and the fountain-code codewords.

According to the data transmission method provided in this embodiment, the second communications device receives the $K_i$ protocol data units (PDUs) sent by the first communications device, obtains the $T_i$ fountain-code codewords based on the received $T_i$ PDUs in the $K_i$ PDUs, performs fountain-code decoding on the $T_i$ fountain-code codewords, and sends the first acknowledgement information to the first communications device when the second communications device obtains the $i^{th}$ data packet in S data packets by performing fountain-code decoding on the $T_i$ fountain-code codewords. In this way, the second communications device needs to send feedback information to the first communications device only after obtaining the complete $i^{th}$ data packet, and does not need to feed back a receiving status of each PDU. This greatly reduces feedback information, saves network resources, and resolves a problem that, when data transmission is performed in a wireless communications network, ACK information or NACK information occupies excessive network resources, thereby affecting data transmission efficiency of a system.

Based on the data transmission method described in the embodiment corresponding to FIG. 6, another embodiment of the present disclosure provides another data transmission method. The data transmission method is applied to the receive-side entity, namely, the second communications device, in the data transmission method in the embodiment corresponding to FIG. 6. According to the data transmission method provided in this embodiment, multi-process data transmission may be implemented when the data transmission method described in the embodiment corresponding to FIG. 6 is performed. This embodiment is described by using data packet transmission as an example.

Figure 7:
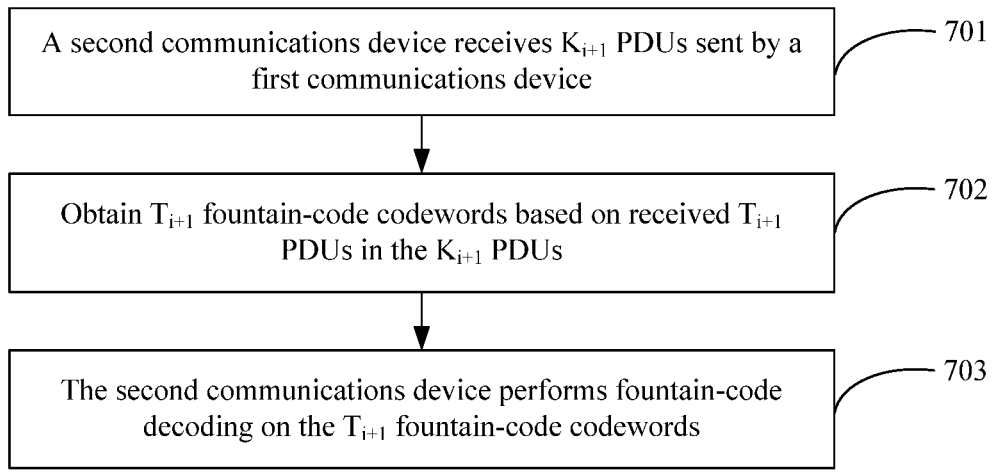
FIG. 7 is a schematic flowchart of another data transmission method according to another embodiment of the present disclosure.

A total length of S data packets is less than or equal to a length of a preset window, and the preset window is used to indicate that data packets sent by a first communications device are a first data packet to an $S^{th}$ data packet in the S data packets. Optionally, the length of the preset window may be adjusted. This embodiment is described by using an example in which the length of the preset window is the length of the S data packets. Referring to FIG. 7, the data transmission method provided in this embodiment includes the following steps.

701. The second communications device receives $K_{i+1}$ PDUs sent by the first communications device.

The $K_{i+1}$ PDUs are generated based on $K_{i+1}$ fountain-code codewords. The $K_{i+1}$ fountain-code codewords are generated based on $N_{i+1}$ data blocks. The $N_{i+1}$ data blocks constitute an $(i+1)^{th}$ data packet in the S data packets. $N_{i+1}$ is an integer greater than 1. $K_{i+1}$ is an integer greater than 1.

702. Obtain $T_{i+1}$ fountain-code codewords based on received $T_{i+1}$ PDUs in the $K_{i+1}$ PDUs.

$T_{i+1}$ is an integer in $[1, K_{i+1}]$.

703. The second communications device performs fountain-code decoding on the $T_{i+1}$ fountain-code codewords.

It should be noted that, in a process of performing steps 701 to 703, the second communications device sequentially performs operations of steps 701 to 703 on each of the S data packets. Processing processes of the data packets are independent of each other. PDUs generated by using the S data packets are simultaneously received, and fountain-code decoding is performed on the received PDUs. In this way, a plurality of data packets may be simultaneously received in a length of a preset window.

In addition, optionally, the second communications device may further send second status information to the first communications device, where the second status information is used to indicate a quantity of PDUs, of the $(i+1)^{th}$ data packet in the S data packets, that are correctly received by the second communications device, so that the first communications device adjusts, based on the second status information, at least one of a sending quantity and a second rate for sending a PDU in the $(i+1)^{th}$ data packet. Optionally, when duration occupied by PDUs that have been received by the second communications device exceeds second preset duration, the second communications device may send the second status information to the first communications device.

According to the data transmission method provided in this embodiment, the second communications device receives the $K_{i+1}$ PDUs sent by the first communications device, obtains the $T_{i+1}$ fountain-code codewords based on the received $T_{i+1}$ PDUs in the $K_{i+1}$ PDUs, and performs fountain-code decoding on the $T_{i+1}$ fountain-code codewords. In this way, the second communications device may simultaneously receive, by using a fountain code, a plurality of data packets sent by the first communications device. This implements multi-process data transmission, improves data transmission efficiency of a wireless network communications system, and resolves a problem that data transmission efficiency of a wireless network communications system is low.

Figure 8:
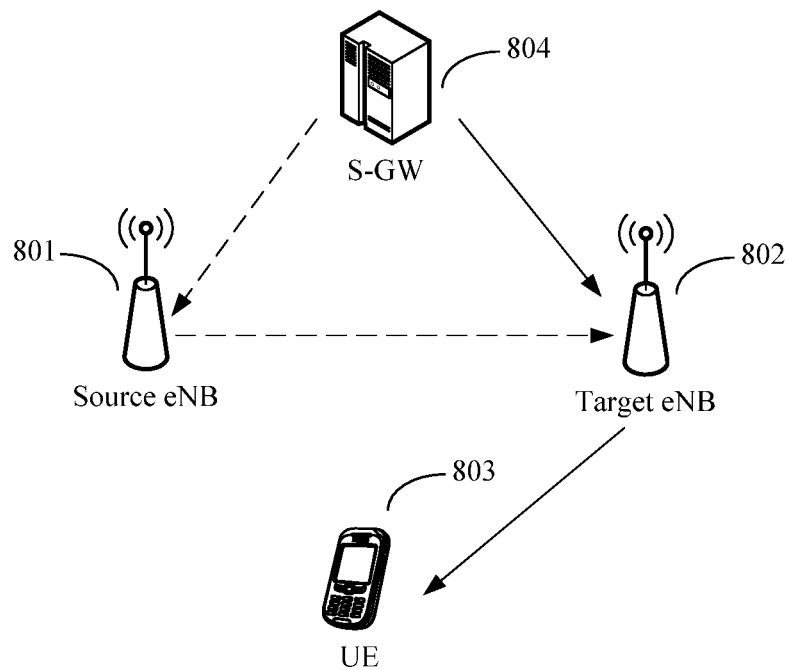
FIG. 8 is a schematic diagram of a communications device switching scenario according to an embodiment of the present disclosure.

Based on the embodiments corresponding to FIG. 2 and FIG. 6, preferably, with reference to the embodiments corresponding to FIG. 4 and FIG. 7, an embodiment of the present disclosure describes the data transmission method provided in the present disclosure in a communications device switching scenario. That a first communications device transmits data to a second communications device needs to be switched to that a third communications device transmits data to the second communications device. Preferably, with reference to the wireless network communications system 10 shown in FIG. 1, the first communications device may be the first eNB 101, and the third communications device may be the second eNB 102. In an uplink data transmission process, the second communications device is the first MME 107. In a downlink data transmission process, the second communications device is the first UE 104. Certainly, herein are merely examples for description, and it does not mean that the present disclosure is limited thereto. FIG. 8 is described by using an example in which an eNB and UE perform downlink data transmission.

A communications device switching scenario shown in FIG. 8 includes a source eNB 801, a target eNB 802, UE 803, and an S-GW 804. Specifically, in this embodiment, a first communications device is the source eNB 801, a second communications device is the UE 803, and a third communications device is the target eNB 802.

When switching occurs, the first communications device sends switching information to the third communications device. The switching information is used to instruct the third communications device to send an $i^{th}$ data packet to the second communications device. The switching information includes at least one of a sequence number of the $i^{th}$ data packet, a rule for fountain-code encoding, and an encoding context. The rule for the fountain-code encoding includes at least one of a length of the $i^{th}$ data packet, a quantity $N_i$ of $N_i$ data blocks, and an encoding matrix. The encoding matrix is used to indicate a mapping relationship between the data blocks and fountain-code codewords. The encoding context is used to indicate at least one of information such as a quantity of generated codes and a status of the encoding matrix.

In addition, the first communications device sends the $i^{th}$ data packet or a to-be-sent PDU in $K_i$ PDUs to the third communications device. In this case, it should be noted that the first communications device may send only the $i^{th}$ data packet to the third communication device, and the third communications device may divide, based on the switching information, the $i^{th}$ data packet into $N_i$ data blocks, generate fountain-code codewords, generate PDUs, and send the PDUs to the second communications device. Alternatively, the first communications device may send only the to-be-sent PDU in the $K_i$ PDUs to the third communications device, with reference to a fountain code principle, the first communications device generates PDUs, and sends the PDUs to the third communications device, and the third communications device sends the PDUs to the second communications device. Alternatively, the first communications device may send both the $i^{th}$ data packet and the to-be-sent PDU in the $K_i$ PDUs to the third communications device. Certainly, herein are merely examples for description, and it does not mean that the present disclosure is limited thereto.

Optionally, the first communications device sends, to the third communications device, a PDU that has been sent and for which no receiving acknowledgement has been received from the second communications device; and the first communications device transmits, to the third communications device, new data sent by the S-GW 804.

In this way, continuity of data transmission is ensured during switching between the first communications device and the third communications device.

Figure 9:
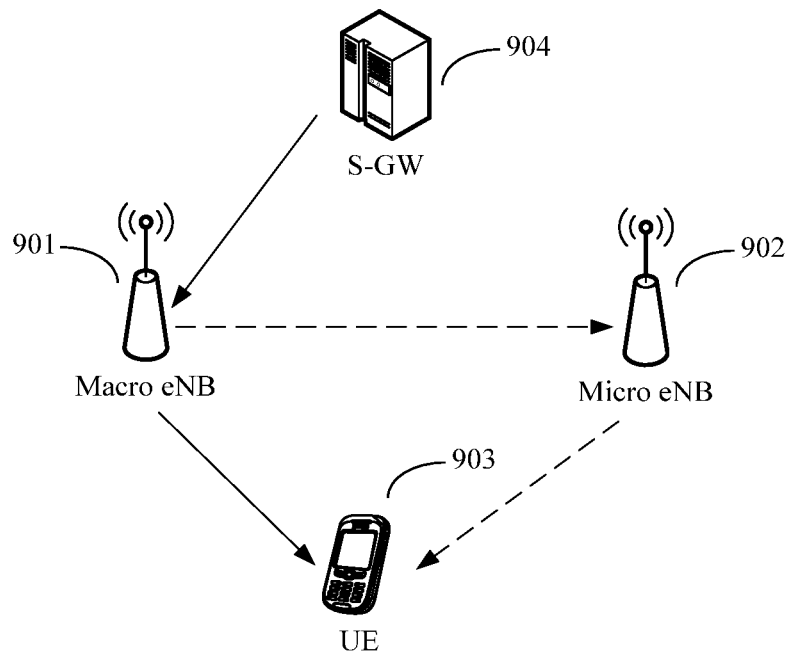
FIG. 9 is a schematic diagram of a multilink scenario according to an embodiment of the present disclosure.

Based on the embodiments corresponding to FIG. 2 and FIG. 6, preferably, with reference to the embodiments corresponding to FIG. 4 and FIG. 7, an embodiment of the present disclosure describes the data transmission method provided in the present disclosure in a multilink scenario. On a first link, a first communications device directly transmits data to a second communications device. On a second link, the first communications device transmits data to the second communications device through forwarding by a fourth communications device. Preferably, with reference to the wireless network communications system 10 shown in FIG. 1, the first communications device may be the first eNB 101, and the fourth communications device may be the second eNB 102. In an uplink data transmission process, the second communications device is the first MME 107. In a downlink data transmission process, the second communications device is the first UE 104. Certainly, herein are merely examples for description, and it does not mean that the present disclosure is limited thereto. FIG. 9 is described by using an example in which an eNB and UE perform downlink data transmission.

A multilink scenario shown in FIG. 9 includes a macro eNB 901, a micro eNB 902, UE 903, and an S-GW 904. Specifically, in this embodiment, a first communications device is the macro eNB 901, a second communications device is the UE 903, and a fourth communications device is the micro eNB 902.

As shown in FIG. 9, the macro eNB 901 receives an $i^{th}$ data packet in S data packets from the S-GW 904, generates PDUs after fountain-code encoding processing, and sends the PDUs to the micro eNB 902 and the UE 903. The micro eNB 902 forwards, to the UE 903, the PDUs sent by the macro eNB 901.

In a multilink transmission scenario, the second communications device (the UE 903) does not need to sort PDUs received on a plurality of links, and only needs to perform combination and decoding. This improves data receiving and decoding efficiency, fully utilizes resources of a network communications system, and improves data transmission efficiency of the network communications system.

After the first communications device (the eNB 901) receives first acknowledgement information sent by the second communications device (the UE 903), the first communications device sends transmission stop information to the fourth communications device (the micro eNB 902). The transmission stop information is used to instruct the fourth communications device to discard a PDU in the $K_i$ PDUs that has been stored. Alternatively, the second communications device sends transmission stop information to the fourth communications device.

Optionally, the second communications device may further send link status information to the first communications device. The link status information is used to indicate a quantity of PDUs received by the second communications device on at least one link, or a data receiving status in a preset time period. The first communications device adjusts an offloading policy based on the link status information sent by the second communications device. Specifically, optionally, if the link status information indicates that a link condition for forwarding from the fourth communications device to the second communications device is relatively good, the first communications device may transmit more PDUs to the fourth communications device, to reduce a quantity of PDUs directly transmitted to the second communications device. Certainly, herein are merely examples for description, and it does not mean that the present disclosure is limited thereto.

With reference to the embodiment corresponding to FIG. 2, an embodiment of the present disclosure provides a first communications device, configured to perform the data transmission method described in the embodiment corresponding to FIG. 2. Optionally, the first communications device provided in this embodiment may also perform the data transmission methods described in the embodiments corresponding to FIG. 4, FIG. 8, and FIG. 9.

Preferably, the first communications device provided in this embodiment is used for data transmission at an RLC layer or a PDCP layer.

Figure 10:
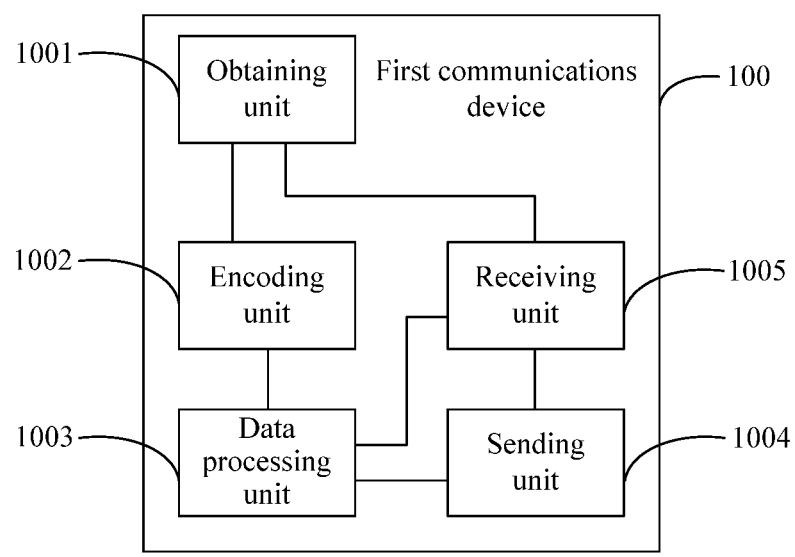
FIG. 10 is a schematic structural diagram of a first communications device according to an embodiment of the present disclosure.

Referring to FIG. 10, the first communications device 100 provided in this embodiment includes an obtaining unit 1001, an encoding unit 1002, a data processing unit 1003, a sending unit 1004, and a receiving unit 1005.

The obtaining unit 1001 is configured to obtain an $i^{th}$ data packet in S data packets, where S is a positive integer, and a value of i is any positive integer ranging from 1 to S.

The encoding unit 1002 is configured to divide the $i^{th}$ data packet into $N_i$ data blocks, and perform fountain-code encoding on the $N_i$ data blocks to generate $K_i$ fountain-code codewords, where $N_i$ is an integer greater than 1, and $K_i$ is an integer greater than 1.

The data processing unit 1003 is configured to generate $K_i$ protocol data units (PDUs) based on the $K_i$ fountain-code codewords, and send the $K_i$ PDUs to a second communications device.

The sending unit 1004 is configured to send the $K_i$ PDUs to a second communications device.

The first communications device 100 further includes a receiving unit 1005.

The sending unit 1004 is further configured to: when the receiving unit 1005 receives first acknowledgement information sent by the second communications device, stop, based on the first acknowledgement information, sending a to-be-sent PDU in the $K_i$ PDUs to the second communications device. The first acknowledgement information is used to indicate that the second communications device has correctly received the $i^{th}$ data packet. The first acknowledgement information may be sent by the second communications device after the second communications device receives $T_i$ PDUs. $T_i$ is an integer in $[1, K_i]$, and $T_i$ is a quantity of PDUs, in the $K_i$ PDUs, that are received by the second communications device.

Optionally, an $m^{th}$ PDU in the $K_i$ PDUs includes at least one of a sequence number m of an $m^{th}$ fountain-code codeword and a length of a last data block in the $m^{th}$ PDU. m is any positive integer ranging from 1 to $K_i$.

Optionally, in a first application scenario, a total length of the S data packets is less than or equal to a length of a preset window, and the preset window is used to indicate that data packets sent by the first communications device are a first data packet to an $S^{th}$ data packet in the S data packets.

The encoding unit 1002 is further configured to divide an $(i+1)^{th}$ data packet in the S data packets into $N_{i+1}$ data blocks, and perform fountain-code encoding on the $N_{i+1}$ data blocks to generate $K_{i+1}$ fountain-code codewords. $N_{i+1}$ is an integer greater than 1, and $K_{i+1}$ is an integer greater than 1.

The data processing unit 1003 is further configured to generate $K_{i+1}$ PDUs based on the $K_{i+1}$ fountain-code codewords.

The sending unit 1004 is further configured to send the $K_{i+1}$ PDUs to the second communications device.

Further, optionally, the data processing unit 1003 is further configured to: after the receiving unit 1005 receives feedback information sent by the second communications device, when the value of i is 1, adjust the data packets indicated by the preset window to a second data packet to an $(S+1)^{th}$ data packet.

Alternatively, optionally, when duration occupied by PDUs, in the $K_i$ PDUs, that have been sent by the first communications device to the second communications device exceeds first preset duration, or when a quantity of PDUs, in the $K_i$ PDUs, that have been sent by the first communications device to the second communications device exceeds a preset quantity, the obtaining unit 1001 is further configured to discard the $i^{th}$ data packet.

The data processing unit 1003 is further configured to: when the value of i is 1, adjust the data packets indicated by the preset window to the second data packet to the $(S+1)^{th}$ data packet.

In addition, optionally, the receiving unit 1005 is further configured to receive second status information sent by the second communications device. The second status information is used to indicate a quantity of PDUs, of the $(i+1)^{th}$ data packet in the S data packets, that are correctly received by the second communications device.

The sending unit 1004 is further configured to adjust, based on the second status information, at least one of a sending quantity and a sending rate for sending a PDU of the $(i+1)^{th}$ data packet.

Further, the receiving unit 1005 is further configured to: when duration occupied by PDUs that have been received by the second communications device exceeds second preset duration, receive the second status information sent by the second communications device.

Optionally, in a second application scenario, the sending unit 1004 is further configured to send switching information to a third communications device. The switching information is used to instruct the third communications device to send the $i^{th}$ data packet to the second communications device. The switching information includes at least one of a sequence number of the $i^{th}$ data packet, a rule for the fountain-code encoding, and an encoding context. The rule for the fountain-code encoding includes at least one of a length of the $i^{th}$ data packet, a quantity $N_i$ of the $N_i$ data blocks, and an encoding matrix. The encoding matrix is used to indicate a mapping relationship between the data blocks and the fountain-code codewords. The encoding context is used to indicate at least one of information such as a quantity of generated codes and a status of the encoding matrix.

The sending unit 1004 is further configured to send the $i^{th}$ data packet or the to-be-sent PDU in the $K_i$ PDUs to the third communications device.

Optionally, in a third application scenario, the first communications device and the second communications device perform data transmission through forwarding by a fourth communications device.

The sending unit 1004 is further configured to send transmission stop information to the fourth communications device. The transmission stop information is used to instruct the fourth communications device to discard a PDU in the $K_i$ PDUs that has been stored.

Optionally, the receiving unit 1005 is further configured to receive link status information sent by the second communications device. The link status information is used to indicate a quantity of PDUs received by the second communications device on at least one link, or a data receiving status in a preset time period.

The sending unit 1004 is further configured to adjust an offloading policy based on the link status information received by the receiving unit 1005.

Optionally, the sending unit 1004 is further configured to send configuration information of the first communications device to the second communications device. The configuration information of the first communications device includes at least one of capability information of the first communications device and the rule for the fountain-code encoding.

The capability information of the first communications device is used to indicate at least one of support of the first communications device for a fountain code, a fountain-code type supported by the first communications device, and a maximum encoding length of the first communications device. The rule for the fountain-code encoding includes at least one of the length of the $i^{th}$ data packet, the quantity $N_i$ of the $N_i$ data blocks, and the encoding matrix. The encoding matrix is used to indicate the mapping relationship between the data blocks and the fountain-code codewords.

The first communications device provided in this embodiment obtains the $i^{th}$ data packet in the S data packets, divides the $i^{th}$ data packet into the $N_i$ data blocks, performs fountain-code encoding on the $N_i$ data blocks to generate the $K_i$ fountain-code codewords, generates the $K_i$ protocol data units (PDUs) based on the $K_i$ fountain-code codewords, sends the $K_i$ PDUs to the second communications device, and when receiving the first acknowledgement information sent by the second communications device, stops, based on the first acknowledgement information, sending the to-be-sent PDU in the $K_i$ PDUs to the second communications device. In this way, the second communications device needs to send feedback information to the first communications device only after obtaining the complete $i^{th}$ data packet, and does not need to feed back a receiving status of each PDU. This greatly reduces feedback information, saves network resources, and resolves a problem that, when data transmission is performed in a wireless communications network, ACK information or NACK information occupies excessive network resources, thereby affecting data transmission efficiency of a system.

With reference to the embodiment corresponding to FIG. 6, an embodiment of the present disclosure provides a second communications device, configured to perform the data transmission method described in the embodiment corresponding to FIG. 6. Optionally, the second communications device provided in this embodiment may also perform the data transmission methods described in the embodiments corresponding to FIG. 7, FIG. 8, and FIG. 9.

Preferably, the second communications device provided in this embodiment is used for data transmission at an RLC layer or a PDCP layer.

Figure 11:
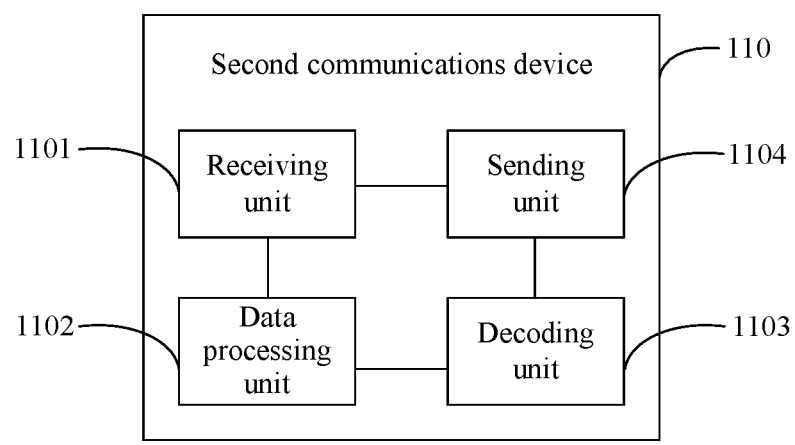
FIG. 11 is a schematic structural diagram of a second communications device according to an embodiment of the present disclosure.

Referring to FIG. 11, the second communications device 110 provided in this embodiment includes a receiving unit 1101, a data processing unit 1102, a decoding unit 1103, and a sending unit 1104.

The receiving unit 1101 is configured to receive $K_i$ protocol data units (PDUs) sent by a first communications device. $K_i$ is an integer greater than 1. The $K_i$ PDUs are generated based on $K_i$ fountain-code codewords. An $m^{th}$ fountain-code codeword in the $K_i$ fountain-code codewords is corresponding to an $m^{th}$ PDU in the $K_i$ PDUs. m is an integer in an interval $[1, K_i]$. The $K_i$ fountain-code codewords are obtained by performing fountain-code encoding on $N_i$ data blocks. The $N_i$ data blocks constitute an $i^{th}$ data packet. $N_i$ is an integer greater than 1.

The data processing unit 1102 is configured to obtain $T_i$ fountain-code codewords based on received $T_i$ PDUs in the $K_i$ PDUs. $T_i$ is any integer in $[1, K_i]$.

The decoding unit 1103 is configured to perform fountain-code decoding on the $T_i$ fountain-code codewords.

The sending unit 1104 is configured to send first acknowledgement information to the first communications device when the decoding unit 1103 obtains the $i^{th}$ data packet in S data packets by performing fountain-code decoding on the $T_i$ fountain-code codewords. The first acknowledgement information is used to indicate that the second communications device has correctly received the $i^{th}$ data packet. S is a positive integer, and a value of i is any positive integer ranging from 1 to S.

Optionally, an $m^{th}$ PDU in the $K_i$ PDUs includes at least one of a sequence number m of an $m^{th}$ fountain-code codeword and a length of a last data block in the $m^{th}$ PDU. m is any positive integer ranging from 1 to $K_i$.

Optionally, a total length of the S data packets is less than or equal to a length of a preset window, and the preset window is used to indicate that data packets sent by the first communications device are a first data packet to an $S^{th}$ data packet in the S data packets.

The receiving unit 1101 is further configured to receive $K_{i+1}$ PDUs sent by the first communications device. The $K_{i+1}$ PDUs are generated based on $K_{i+1}$ fountain-code codewords. The $K_{i+1}$ fountain-code codewords are generated based on $N_{i+1}$ data blocks. The $N_{i+1}$ data blocks constitute an $(i+1)^{th}$ data packet in the S data packets. $N_{i+1}$ is an integer greater than 1, and $K_{i+1}$ is an integer greater than 1.

The data processing unit 1102 is further configured to obtain $T_{i+1}$ fountain-code codewords based on received $T_{i+1}$ PDUs in the $K_{i+1}$ PDUs. $T_{i+1}$ is an integer in $[1, K_{i+1}]$.

The decoding unit 1103 is further configured to perform fountain-code decoding on the $T_{i+1}$ fountain-code codewords obtained by the data processing unit 1102.

Optionally, the sending unit 1104 is further configured to send second status information to the first communications device. The second status information is used to indicate a quantity of PDUs, of the $(i+1)^{th}$ data packet in the S data packets, that are correctly received by the second communications device, so that the first communications device adjusts, based on the second status information, at least one of a sending quantity and a second rate for sending a PDU in the $(i+1)^{th}$ data packet.

Further, the sending unit 1104 is further configured to: when duration occupied by PDUs that have been received by the second communications device exceeds second preset duration, send the second status information to the first communications device.

In a possible implementation, the first communications device and the second communications device perform data transmission through forwarding by a fourth communications device.

The sending unit 1104 is further configured to send transmission stop information to the fourth communications device. The transmission stop information is used to instruct the fourth communications device to discard a PDU in the $K_i$ PDUs that has been stored.

Optionally, the sending unit 1104 is further configured to send link status information to the first communications device. The link status information is used to indicate a quantity of PDUs received by the second communications device on at least one link, or a data receiving status in a preset time period.

Optionally, the receiving unit 1101 is further configured to receive configuration information of the first communications device that is sent by the first communications device. The configuration information of the first communications device includes at least one of capability information of the first communications device and a rule for fountain-code encoding.

The capability information of the first communications device is used to indicate at least one of support of the first communications device for a fountain code, a fountain-code type supported by the first communications device, and a maximum encoding length of the first communications device. The rule for the fountain-code encoding includes at least one of the length of the $i^{th}$ data packet, the quantity $N_i$ of the $N_i$ data blocks, and the encoding matrix. The encoding matrix is used to indicate a mapping relationship between the data blocks and the fountain-code codewords.

The second communications device provided in this embodiment receives the $K_i$ protocol data units (PDUs) sent by the first communications device, obtains the $T_i$ fountain-code codewords based on the received $T_i$ PDUs in the $K_i$ PDUs, performs fountain-code decoding on the $T_i$ fountain-code codewords, and sends the first acknowledgement information to the first communications device when the second communications device obtains the $i^{th}$ data packet in the S data packets by performing fountain-code decoding on the $T_i$ fountain-code codewords. In this way, the second communications device needs to send feedback information to the first communications device only after obtaining the complete $i^{th}$ data packet, and does not need to feed back a receiving status of each PDU. This greatly reduces feedback information, saves network resources, and resolves a problem that, when data transmission is performed in a wireless communications network, ACK information or NACK information occupies excessive network resources, thereby affecting data transmission efficiency of a system.

With reference to the embodiment corresponding to FIG. 2, an embodiment of the present disclosure provides another first communications device, configured to perform the data transmission method described in the embodiment corresponding to FIG. 2. Optionally, the first communications device provided in this embodiment may also perform the data transmission methods described in the embodiments corresponding to FIG. 4, FIG. 8, and FIG. 9.

Preferably, the first communications device provided in this embodiment is used for data transmission at an RLC layer or a PDCP layer.

Figure 12:
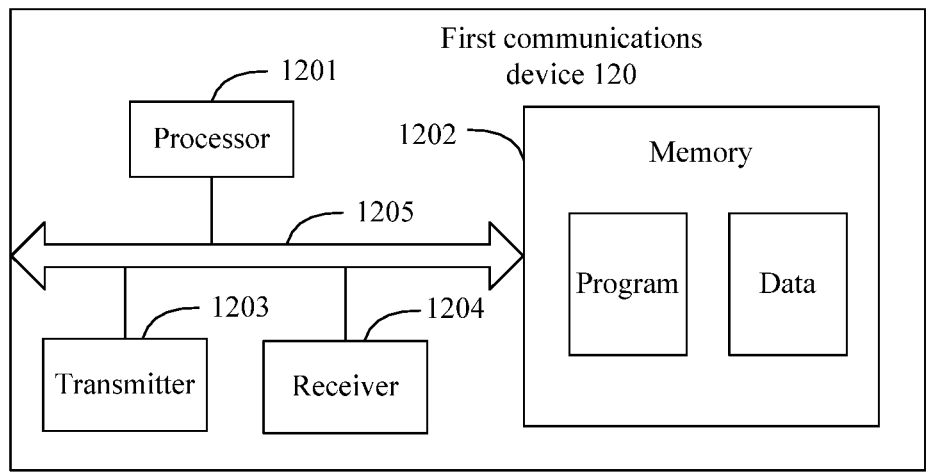
FIG. 12 is a schematic structural diagram of another first communications device according to an embodiment of the present disclosure.

Referring to FIG. 12, the first communications device 120 provided in this embodiment includes a processor 1201, a memory 1202, a transmitter 1203, a receiver 1204, and a bus 1205. The bus 1205 is configured to connect the processor 1201, the memory 1202, the transmitter 1203, and the receiver 1204. The processor 1201 is configured to execute a program stored in the memory 1202. It should be noted that the transmitter 1203 and the receiver 1204 may be controlled by independent programs. For example, the transmitter 1203 and the receiver 1204 each may have an independent chip. Alternatively, the transmitter 1203 and the receiver 1204 merely perform data sending and receiving, and a further processing process is performed by the processor 1201 by invoking a program. This is not limited in the present disclosure.

The processor 1201 is configured to: obtain an $i^{th}$ data packet in S data packets, where S is a positive integer, and a value of i is any positive integer ranging from 1 to S; divide the $i^{th}$ data packet into $N_i$ data blocks, and perform fountain-code encoding on the $N_i$ data blocks to generate $K_i$ fountain-code codewords, where $N_i$ is an integer greater than 1, and $K_i$ is an integer greater than 1; and generate $K_i$ protocol data units (PDUs) based on the $K_i$ fountain-code codewords.

The transmitter 1203 is configured to send the $K_i$ PDUs to a second communications device.

The transmitter 1203 is further configured to: when the receiver 1204 receives first acknowledgement information sent by the second communications device, stop, based on the first acknowledgement information, sending a to-be-sent PDU in the $K_i$ PDUs to the second communications device. The first acknowledgement information is used to indicate that the second communications device has correctly received the $i^{th}$ data packet. The first acknowledgement information may be sent by the second communications device after the second communications device receives $T_i$ PDUs. $T_i$ is an integer in [1, $K_i$], and $T_i$ is a quantity of PDUs, in the K PDUs, that are received by the second communications device.

Optionally, an $m^{th}$ PDU in the $K_i$ PDUs includes at least one of a sequence number m of an $m^{th}$ fountain-code codeword and a length of a last data block in the $m^{th}$ PDU. m is any positive integer ranging from 1 to $K_i$.

Optionally, in a first application scenario, a total length of the S data packets is less than or equal to a length of a preset window, and the preset window is used to indicate that data packets sent by the first communications device are a first data packet to an $S^{th}$ data packet in the S data packets.

The processor 1201 is further configured to: divide an $(i+1)^{th}$ data packet in the S data packets into $N_{i+1}$ data blocks, and perform fountain-code encoding on the $N_{i+1}$ data blocks to generate $K_{i+1}$ fountain-code codewords, where $N_{i+1}$ is an integer greater than 1, and $K_{i+1}$ is an integer greater than 1; and generate $K_{i+1}$ PDUs based on the $K_{i+1}$ fountain-code codewords.

The transmitter 1203 is further configured to send the $K_{i+1}$ PDUs to the second communications device.

Further, optionally, the processor 1201 is further configured to: after the receiver 1204 receives feedback information sent by the second communications device, when the value of i is 1, adjust the data packets indicated by the preset window to a second data packet to an $(S+1)^{th}$ data packet.

Optionally, the processor 1201 is further configured to: discard the $i^{th}$ data packet when duration occupied by PDUs, in the $K_i$ PDUs, that have been sent by the first communications device to the second communications device exceeds first preset duration, or when a quantity of PDUs, in the $K_i$ PDUs, that have been sent by the first communications device to the second communications device exceeds a preset quantity; and when the value of i is 1, adjust the data packets indicated by the preset window to the second data packet to the $(S+1)^{th}$ data packet.

In addition, optionally, the receiver 1204 is further configured to receive second status information sent by the second communications device. The second status information is used to indicate a quantity of PDUs, of the $(i+1)^{th}$ data packet in the S data packets, that are correctly received by the second communications device.

Further, the receiver 1204 is further configured to: when duration occupied by PDUs that have been received by the second communications device exceeds second preset duration, receive the second status information sent by the second communications device.

The transmitter 1203 is further configured to adjust, based on the second status information received by the receiver 1204, at least one of a sending quantity and a sending rate for sending a PDU of the $(i+1)^{th}$ data packet.

Optionally, in a second application scenario, the transmitter 1203 is further configured to send switching information to a third communications device. The switching information is used to instruct the third communications device to send the $i^{th}$ data packet to the second communications device. The switching information includes at least one of a sequence number of the $i^{th}$ data packet, a rule for the fountain-code encoding, and an encoding context. The rule for the fountain-code encoding includes at least one of a length of the $i^{th}$ data packet, a quantity $N_i$ of the $N_i$ data blocks, and an encoding matrix. The encoding matrix is used to indicate a mapping relationship between the data blocks and the fountain-code codewords. The encoding context is used to indicate at least one of information such as a quantity of generated codes and a status of the encoding matrix.

The transmitter 1203 is further configured to send the $i^{th}$ data packet or the to-be-sent PDU in the $K_i$ PDUs to the third communications device.

Optionally, in a third application scenario, the first communications device and the second communications device perform data transmission through forwarding by a fourth communications device.

The transmitter 1203 is further configured to send transmission stop information to the fourth communications device. The transmission stop information is used to instruct the fourth communications device to discard a PDU in the $K_i$ PDUs that has been stored.

Optionally, the receiver 1204 is further configured to receive link status information sent by the second communications device. The link status information is used to indicate a quantity of PDUs received by the second communications device on at least one link, or a data receiving status in a preset time period.

The transmitter 1203 is further configured to adjust an offloading policy based on the link status information received by the receiver 1204.

Optionally, the transmitter 1203 is further configured to send configuration information of the first communications device to the second communications device. The configuration information of the first communications device includes at least one of capability information of the first communications device and the rule for the fountain-code encoding.

The capability information of the first communications device is used to indicate at least one of support of the first communications device for a fountain code, a fountain-code type supported by the first communications device, and a maximum encoding length of the first communications device. The rule for the fountain-code encoding includes at least one of the length of the $i^{th}$ data packet, the quantity $N_i$ of the $N_i$ data blocks, and the encoding matrix. The encoding matrix is used to indicate the mapping relationship between the data blocks and the fountain-code codewords.

The first communications device provided in this embodiment obtains the $i^{th}$ data packet in the S data packets, divides the $i^{th}$ data packet into the $N_i$ data blocks, performs fountain-code encoding on the $N_i$ data blocks to generate the $K_i$ fountain-code codewords, generates the $K_i$ protocol data units (PDUs) based on the $K_i$ fountain-code codewords, sends the $K_i$ PDUs to the second communications device, and when receiving the first acknowledgement information sent by the second communications device, stops, based on the first acknowledgement information, sending the to-be-sent PDU in the $K_i$ PDUs to the second communications device. In this way, the second communications device needs to send feedback information to the first communications device only after obtaining the complete $i^{th}$ data packet, and does not need to feed back a receiving status of each PDU. This greatly reduces feedback information, saves network resources, and resolves a problem that, when data transmission is performed in a wireless communications network, ACK information or NACK information occupies excessive network resources, thereby affecting data transmission efficiency of a system.

With reference to the embodiment corresponding to FIG. 6, an embodiment of the present disclosure provides another second communications device, configured to perform the data transmission method described in the embodiment corresponding to FIG. 6. Optionally, the second communications device provided in this embodiment may also perform the data transmission methods described in the embodiments corresponding to FIG. 7, FIG. 8, and FIG. 9.

Preferably, the second communications device provided in this embodiment is used for data transmission at an RLC layer or a PDCP layer.

Figure 13:
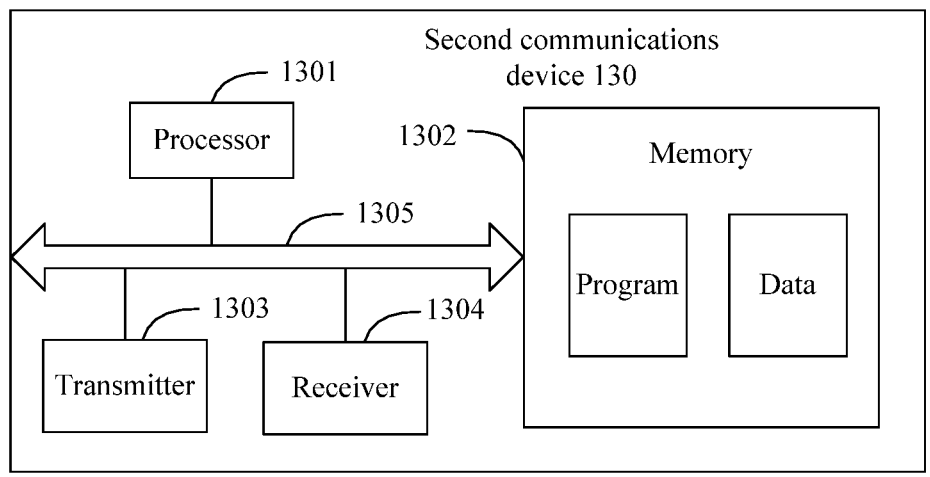
FIG. 13 is a schematic structural diagram of another second communications device according to an embodiment of the present disclosure.

Referring to FIG. 13, the second communications device 130 provided in this embodiment includes a processor 1301, a memory 1302, a transmitter 1303, a receiver 1304, and a bus 1305. The bus 1305 is configured to connect the processor 1301, the memory 1302, the transmitter 1303, and the receiver 1304. The processor 1301 is configured to execute a program stored in the memory 1302. It should be noted that the transmitter 1303 and the receiver 1304 may be controlled by independent programs. For example, the transmitter 1303 and the receiver 1304 each may have an independent chip. Alternatively, the transmitter 1303 and the receiver 1304 merely perform data sending and receiving, and a further processing process is performed by the processor 1301 by invoking a program. This is not limited in the present disclosure.

The receiver 1304 is configured to receive $K_i$ protocol data units (PDUs) sent by a first communications device. $K_i$ is an integer greater than 1. The $K_i$ PDUs are generated based on $K_i$ fountain-code codewords. An $m^{th}$ fountain-code codeword in the $K_i$ fountain-code codewords is corresponding to an $m^{th}$ PDU in the $K_i$ PDUs. m is an integer in an interval $[1, K_i]$. The $K_i$ fountain-code codewords are obtained by performing fountain-code encoding on $N_i$ data blocks. The $N_i$ data blocks constitute an $i^{th}$ data packet. $N_i$ is an integer greater than 1.

The processor 1301 is configured to obtain $T_i$ fountain-code codewords based on received $T_i$ PDUs in the $K_i$ PDUs. $T_i$ is any integer in $[1, K_i]$.

The transmitter 1303 is configured to send first acknowledgement information to the first communications device when the processor 1301 obtains the $i^{th}$ data packet in S data packets by performing fountain-code decoding on the $T_i$ fountain-code codewords. The first acknowledgement information is used to indicate that the second communications device has correctly received the $i^{th}$ data packet. S is a positive integer, and a value of i is any positive integer ranging from 1 to S.

Optionally, an $m^{th}$ PDU in the $K_i$ PDUs includes at least one of a sequence number m of an $m^{th}$ fountain-code codeword and a length of a last data block in the $m^{th}$ PDU. m is any positive integer ranging from 1 to $K_i$.

Optionally, a total length of the S data packets is less than or equal to a length of a preset window, and the preset window is used to indicate that data packets sent by the first communications device are a first data packet to an $S^{th}$ data packet in the S data packets.

The receiver 1304 is further configured to receive $K_{i+1}$ PDUs sent by the first communications device. The $K_{i+1}$ PDUs are generated based on $K_{i+1}$ fountain-code codewords. The $K_{i+1}$ fountain-code codewords are generated based on $N_{i+1}$ data blocks. The $N_{i+1}$ data blocks constitute an $(i+1)^{th}$ data packet in the S data packets. $N_{i+1}$ is an integer greater than 1, and $K_{i+1}$ is an integer greater than 1.

The processor 1301 is further configured to obtain $T_{i+1}$ fountain-code codewords based on received $T_{i+1}$ PDUs in the $K_{i+1}$ PDUs. $T_{i+1}$ is an integer in $[1, K_{i+1}]$.

Optionally, the transmitter 1303 is further configured to send second status information to the first communications device. The second status information is used to indicate a quantity of PDUs, in the $(i+1)^{th}$ data packet in the S data packets, that are correctly received by the second communications device, so that the first communications device adjusts, based on the second status information, at least one of a sending quantity and a second rate for sending a PDU in the $(i+1)^{th}$ data packet.

Further, the transmitter 1303 is further configured to: when duration occupied by PDUs that have been received by the second communications device exceeds second preset duration, send the second status information to the first communications device.

In a possible implementation, the first communications device and the second communications device perform data transmission through forwarding by a fourth communications device.

The transmitter 1303 is further configured to send transmission stop information to the fourth communications device. The transmission stop information is used to instruct the fourth communications device to discard a PDU in the $K_i$ PDUs that has been stored.

Optionally, the transmitter 1303 is further configured to send link status information to the first communications device. The link status information is used to indicate a quantity of PDUs received by the second communications device on at least one link, or a data receiving status in a preset time period.

Optionally, the receiver 1304 is further configured to receive configuration information of the first communications device that is sent by the first communications device. The configuration information of the first communications device includes at least one of capability information of the first communications device and a rule for fountain-code encoding.

The capability information of the first communications device is used to indicate at least one of support of the first communications device for a fountain code, a fountain-code type supported by the first communications device, and a maximum encoding length of the first communications device. The rule for the fountain-code encoding includes at least one of the length of the $i^{th}$ data packet, the quantity $N_i$ of the $N_i$ data blocks, and the encoding matrix. The encoding matrix is used to indicate the mapping relationship between the data blocks and the fountain-code codewords.

The second communications device provided in this embodiment receives the $K_i$ protocol data units (PDUs) sent by the first communications device, obtains the $T_i$ fountain-code codewords based on the received $T_i$ PDUs in the $K_i$ PDUs, performs fountain-code decoding on the $T_i$ fountain-code codewords, and sends the first acknowledgement information to the first communications device when the second communications device obtains the $i^{th}$ data packet in the S data packets by performing fountain-code decoding on the $T_i$ fountain-code codewords. In this way, the second communications device needs to send feedback information to the first communications device only after obtaining the complete $i^{th}$ data packet, and does not need to feed back a receiving status of each PDU. This greatly reduces feedback information, saves network resources, and resolves a problem that, when data transmission is performed in a wireless communications network, ACK information or NACK information occupies excessive network resources, thereby affecting data transmission efficiency of a system.

With reference to the embodiments corresponding to FIG. 2 and FIG. 6, an embodiment of the present disclosure provides a data transmission system, configured to perform the data transmission methods described in the embodiments corresponding to FIG. 2 and FIG. 6. Optionally, the data transmission system provided in this embodiment may also perform the data transmission methods described in the embodiments corresponding to FIG. 4, FIG. 7, FIG. 8, and FIG. 9. Preferably, the data transmission system provided in this embodiment may be the wireless network communications system 10 described in the embodiment corresponding to FIG. 1.

Preferably, the data transmission system provided in this embodiment may be used for data transmission at an RLC layer or at a PDCP layer.

Figure 14:
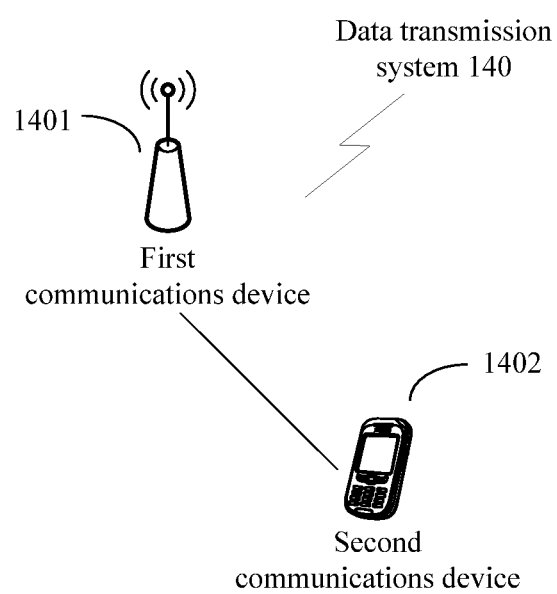
FIG. 14 is a schematic structural diagram of a data transmission system according to an embodiment of the present disclosure.

Referring to FIG. 14, the data transmission system 140 provided in this embodiment includes a first communications device 1401 and a second communications device 1402.

The first communications device 1401 is the first communications device described in the embodiment corresponding to FIG. 10, and the second communications device 1402 is the second communications device described in the embodiment corresponding to FIG. 11.

Alternatively, the first communications device 1401 is the first communications device described in the embodiment corresponding to FIG. 12, and the second communications device 1402 is the second communications device described in the embodiment corresponding to FIG. 13.

The data transmission system provided in this embodiment includes the first communications device and the second communications device. The first communications device obtains an $i^{th}$ data packet in S data packets, divides the $i^{th}$ data packet into $N_i$ data blocks, performs fountain-code encoding on the $N_i$ data blocks to generate $K_i$ fountain-code codewords, generates $K_i$ protocol data units (PDUs) based on the $K_i$ fountain-code codewords, sends the $K_i$ PDUs to the second communications device, and when receiving first acknowledgement information sent by the second communications device, stops, based on the first acknowledgement information, sending a to-be-sent PDU in the $K_i$ PDUs to the second communications device. In this way, the second communications device needs to send feedback information to the first communications device only after obtaining the complete $i^{th}$ data packet, and does not need to feed back a receiving status of each PDU. This greatly reduces feedback information, saves network resources, and resolves a problem that, when data transmission is performed in a wireless communications network, ACK information or NACK information occupies excessive network resources, thereby affecting data transmission efficiency of a system. Further, the first communications device may simultaneously send a plurality of data packets to the second communications device by using a fountain code. This implements multi-process data transmission, improves data transmission efficiency of a wireless network communications system, and resolves a problem that data transmission efficiency of a wireless network communications system is low.

Persons of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely example embodiments of the present disclosure, but are not intended to limit the present disclosure. Any modification, equivalent replacement, and improvement made without departing from the principle of the present disclosure shall fall within the protection scope of the present disclosure.

What is claimed is:

1. A method, comprising:
obtaining, by a first communications device, an $i^{th}$ data packet in S data packets, wherein S is a positive integer, and i is any positive integer in a range from 1 to S;
dividing, by the first communications device, the $i^{th}$ data packet into $N_i$ data blocks, and performing fountain-code encoding on the $N_i$ data blocks to generate $K_i$ fountain-code codewords, wherein $N_i$ is an integer greater than 1, and $K_i$ is an integer greater than 1;
generating, by the first communications device, $K_i$ protocol data units (PDUs) based on the $K_i$ fountain-code codewords;
sending, by the first communications device to a second communications device, with each PDU of the $K_i$ PDUs, configuration information of the first communications device, wherein the configuration information of the first communications device comprises an encoding matrix indicating a plurality of data blocks of the $N_i$ data blocks selected to obtain a corresponding fountain-code codeword of the $K_i$ fountain-code codewords;

sending, by the first communications device to the second communications device, a first portion of the $K_i$ PDUs;

receiving, by the first communications device from the second communications device, first acknowledgment information, wherein the first acknowledgement information indicates whether the second communications device has correctly received the $i^{th}$ data packet; and stopping, by the first communications device based on the first acknowledgement information, a process of sending a remaining portion of the $K_i$ PDUs to the second communications device, when the first acknowledgement information indicates that the second communications device has correctly received the $i^{th}$ data packet.

2. The method according to claim 1, further comprising:
sending, by the first communications device, switching information to a third communications device, wherein the switching information instructs the third communications device to send the $i^{th}$ data packet to the second communications device, wherein the switching information comprises a sequence number of the $i^{th}$ data packet, a rule for the fountain-code encoding, or an encoding context, wherein the rule for the fountain-code encoding comprises a length of the $i^{th}$ data packet, a quantity $N_i$ of the $N_i$ data blocks, or the encoding matrix, and wherein the encoding context indicates information of a quantity of generated codes or a status of the encoding matrix; and sending, by the first communications device, the $i^{th}$ data packet or the remaining portion of the $K_i$ PDUs to the third communications device.

3. The method according to claim 1, wherein the first communications device and the second communications device perform data transmission through forwarding by a fourth communications device; and wherein after the first communications device receives the first acknowledgement information sent by the second communications device, the method further comprises:
sending, by the first communications device, transmission stop information to the fourth communications device, wherein the transmission stop information instructs the fourth communications device to discard a second PDU in the $K_i$ PDUs, wherein the second PDU has been stored.

4. The method according to claim 1, further comprising:
receiving, by the first communications device, link status information sent by the second communications device, wherein the link status information indicates a quantity of PDUs received by the second communications device on at least one link, or a data receiving status in a preset time period; and adjusting, by the first communications device, an offloading policy based on the link status information.

5. The method according to claim 1, wherein:
the configuration information of the first communications device further comprises capability information of the first communications device or a rule for the fountain-code encoding;

the capability information of the first communications device indicates support of the first communications device for a fountain code, a fountain-code type supported by the first communications device, or a maximum encoding length of the first communications device; and the rule for the fountain-code encoding comprises a length of the $i^{th}$ data packet, a quantity $N_i$ of the $N_i$ data blocks, or the encoding matrix.

6. The method of claim 1, wherein generating the $K_i$ PDUs comprises generating, by the first communications device, for each PDU in the $K_i$ PDUs, a header comprising:
a length of the $i^{th}$ data packet;
a quantity $N_i$ of the $N_i$ data blocks used to generate the $K_i$ PDUs; and
the encoding matrix indicating the plurality of data blocks of the $N_i$ data blocks selected to obtain the corresponding fountain-code codeword of the $K_i$ fountain-code codewords.

7. A first communications device, comprising:
a transmitter;
a receiver; and
a processor coupled with the transmitter and the receiver;
wherein the processor is configured to:
obtain an $i^{th}$ data packet in S data packets, wherein S is a positive integer, and i is any positive integer in a range from 1 to S;
divide the $i^{th}$ data packet into $N_i$ data blocks, and perform fountain-code encoding on the $N_i$ data blocks to generate $K_i$ fountain-code codewords, wherein $N_i$ is an integer greater than 1, and $K_i$ is an integer greater than 1; and
generate $K_i$ protocol data units (PDUs) based on the $K_i$ fountain-code codewords;

wherein the transmitter is configured to:
send, to a second communications device, with each PDU of the $K_i$ PDUs, configuration information of the first communications device, wherein the configuration information of the first communications device comprises an encoding matrix indicating a plurality of data blocks of the $N_i$ data blocks selected to obtain a corresponding fountain-code codeword of the $K_i$ fountain-code codewords; and
send, to the second communications device, a first portion of the $K_i$ PDUs;

wherein the receiver is configured to receive first acknowledgement information sent by the second communications device, the first acknowledgement information indicating that the second communications device has correctly received the $i^{th}$ data packet; and wherein the transmitter is further configured to stop, based on the first acknowledgement information, a process of sending a remaining portion of the $K_i$ PDUs to the second communications device.

8. The first communications device according to claim 7, wherein the transmitter is further configured to:
send switching information to a third communications device, wherein the switching information instructs the third communications device to send the $i^{th}$ data packet to the second communications device, wherein the switching information comprises a sequence number of the $i^{th}$ data packet, a rule for the fountain-code encoding, or an encoding context, wherein the rule for the fountain-code encoding comprises a length of the $i^{th}$ data packet, a quantity $N_i$ of the $N_i$ data blocks, or the encoding matrix, and wherein the encoding context indicates information of a quantity of generated codes or a status of the encoding matrix; and
wherein the transmitter is further configured to send the $i^{th}$ data packet or the remaining portion of the $K_i$ PDUs to the third communications device.

9. The first communications device according to claim 7, wherein the first communications device and the second communications device perform data transmission through forwarding by a fourth communications device; and wherein the transmitter is further configured to send transmission stop information to the fourth communications device, wherein the transmission stop information instructs the fourth communications device to discard a second PDU in the $K_i$ PDUs, wherein the second PDU has been stored.

10. The first communications device according to claim 7, wherein the receiver is further configured to receive link status information sent by the second communications device, wherein the link status information indicates a quantity of PDUs received by the second communications device on at least one link, or a data receiving status in a preset time period; and wherein the transmitter is further configured to adjust an offloading policy based on the link status information.

11. The first communications device according to claim 7, wherein:

the configuration information of the first communications device further comprises capability information of the first communications device or a rule for the fountain-code encoding;

the capability information of the first communications device indicates support of the first communications device for a fountain code, a fountain-code type supported by the first communications device, or a maximum encoding length of the first communications device; and the rule for the fountain-code encoding comprises a length of the $i^{th}$ data packet, a quantity $N_i$ of the $N_i$ data blocks, or the encoding matrix.

12. A second communications device, comprising:
a receiver;
a processor; and
a transmitter;
wherein the receiver is configured to:

receive, from a first communications device, $T_i$ protocol data units (PDUs) of $K_i$ PDUs generated by the first communications device, wherein $K_i$ is an integer greater than 1, and wherein $T_i$ is any integer in [1, $K_i$];

receive, from the first communications device, with each PDU of the $T_i$ PDUs, configuration information of the first communications device, wherein the configuration information of the first communications device comprises an encoding matrix indicating a plurality of data blocks of $N_i$ data blocks selected to obtain a corresponding fountain-code codeword of $K_i$ fountain-code codewords, the $K_i$ fountain-code codewords having been used to generate the $K_i$ PDUs;

wherein the processor is configured to:
obtain $T_i$ fountain-code codewords based on the $T_i$ PDUs; and
perform fountain-code decoding on the $T_i$ fountain-code codewords; and wherein the transmitter is configured to send first acknowledgement information to the first communications device when the second communications device obtains an $i^{th}$ data packet in S data packets by performing the fountain-code decoding on the $T_i$ fountain-code codewords, wherein the first acknowledgement information indicates that the second communications device has correctly received the $i^{th}$ data packet, wherein sending the first acknowledgement information causes the first communications device to stop a process of sending a remaining portion of the $K_i$ PDUs, and wherein S is a positive integer, and i is any positive integer ranging from 1 to S.

13. The second communications device according to claim 12, wherein the first communications device and the second communications device perform data transmission through forwarding by a fourth communications device; and wherein the transmitter is further configured to send transmission stop information to the fourth communications device, wherein the transmission stop information instructs the fourth communications device to discard a second PDU in the $K_i$ PDUs, wherein the second PDU has been stored.

14. The second communications device according to claim 12, wherein the transmitter is further configured to send link status information to the first communications device, wherein the link status information indicates a quantity of PDUs received by the second communications device on at least one link, or a data receiving status in a preset time period.

15. The second communications device according to claim 12, wherein:

the configuration information of the first communications device further comprises capability information of the first communications device and a rule for the fountain-code encoding;

the capability information of the first communications device indicates support of the first communications device for a fountain code, a fountain-code type supported by the first communications device, or a maximum encoding length of the first communications device; and the rule for the fountain-code encoding comprises a length of the $i^{th}$ data packet, a quantity $N_i$ of the $N_i$ data blocks used to generate the $K_i$ PDUs, or the encoding matrix.

* * * * *